United States Patent
Hsu et al.

(10) Patent No.: US 8,437,091 B2
(45) Date of Patent: May 7, 2013

(54) WIDE VIEWING ANGLE OPTICAL LENS ASSEMBLY

(75) Inventors: Chih-Wen Hsu, Taichung (TW); Ming-Ta Chou, Taichung (TW); Tsung-Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 128 days.

(21) Appl. No.: 13/155,213

(22) Filed: Jun. 7, 2011

(65) Prior Publication Data

US 2012/0212839 A1 Aug. 23, 2012

(30) Foreign Application Priority Data

Feb. 23, 2011 (TW) .............................. 100106055 A

(51) Int. Cl.
*G02B 3/02* (2006.01)
*G02B 13/18* (2006.01)
*G02B 9/12* (2006.01)

(52) U.S. Cl.
USPC .............................. 359/716; 359/708; 359/784

(58) Field of Classification Search .................. 359/642, 359/708, 713–715, 716, 784
See application file for complete search history.

(56) References Cited

U.S. PATENT DOCUMENTS

| 6,490,102 | B1 | 12/2002 | Huang | |
|---|---|---|---|---|
| 7,262,925 | B2 | 8/2007 | Huang | |
| 7,397,612 | B2* | 7/2008 | Chen et al. | 359/716 |
| 7,605,986 | B2* | 10/2009 | Hung et al. | 359/682 |
| 2006/0187557 | A1* | 8/2006 | Yamakawa | 359/771 |
| 2008/0080065 | A1* | 4/2008 | Asami | 359/716 |

* cited by examiner

*Primary Examiner* — Thomas K Pham
*Assistant Examiner* — William M Johnson
(74) *Attorney, Agent, or Firm* — Morris Manning & Martin LLP; Tim Tingkang Xia, Esq.

(57) ABSTRACT

A wide viewing angle optical lens assembly comprises, in order from an object side to an image side, a first lens element with negative refractive power having a convex object-side surface and a concave image-side surface, a second lens element with positive refractive power having a convex object-side surface, a third lens element with positive refractive power having a convex image-side surface. By adjusting the relationship among the above-mentioned lens elements, the wide viewing angle optical lens assembly can effectively reduce its size, obtain greater angle of view as well as superior imaging quality.

17 Claims, 20 Drawing Sheets

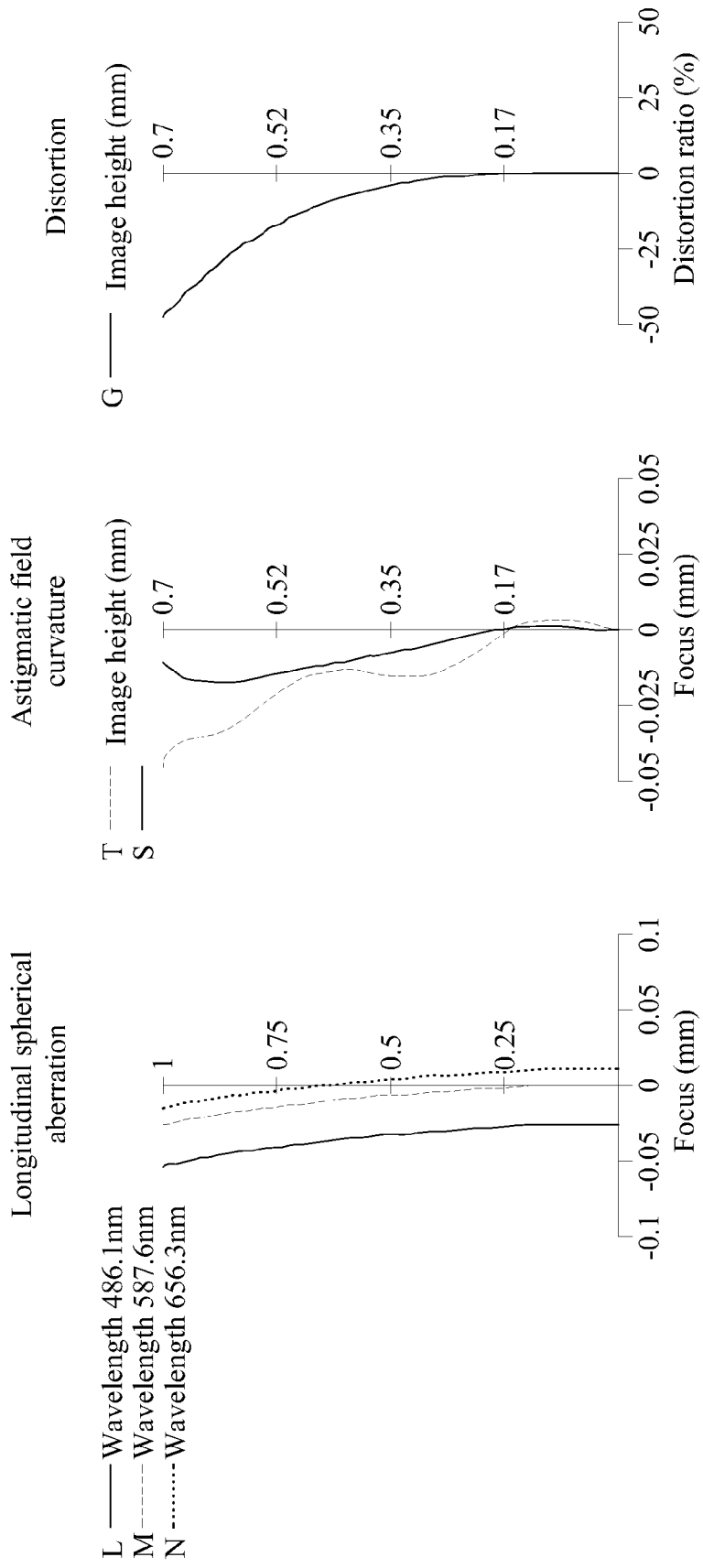

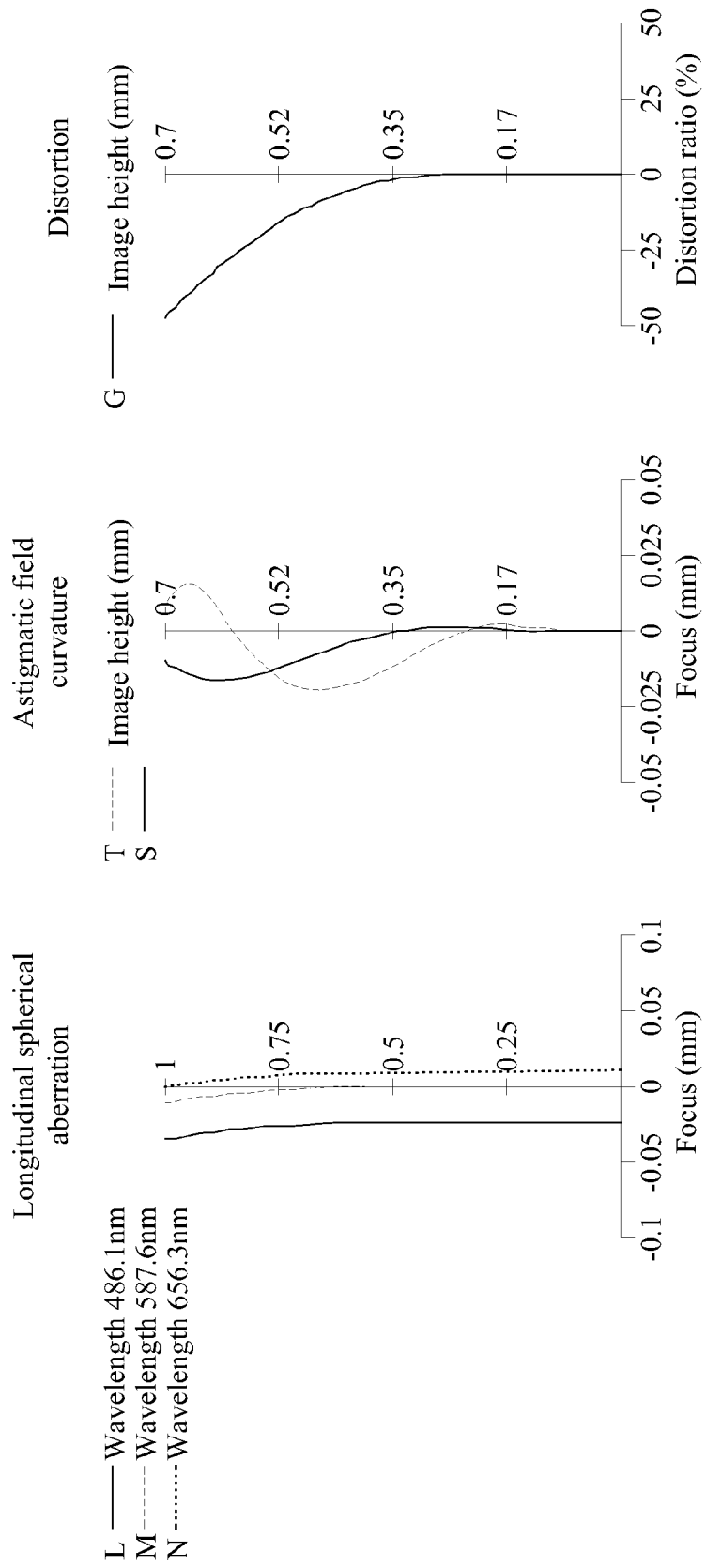

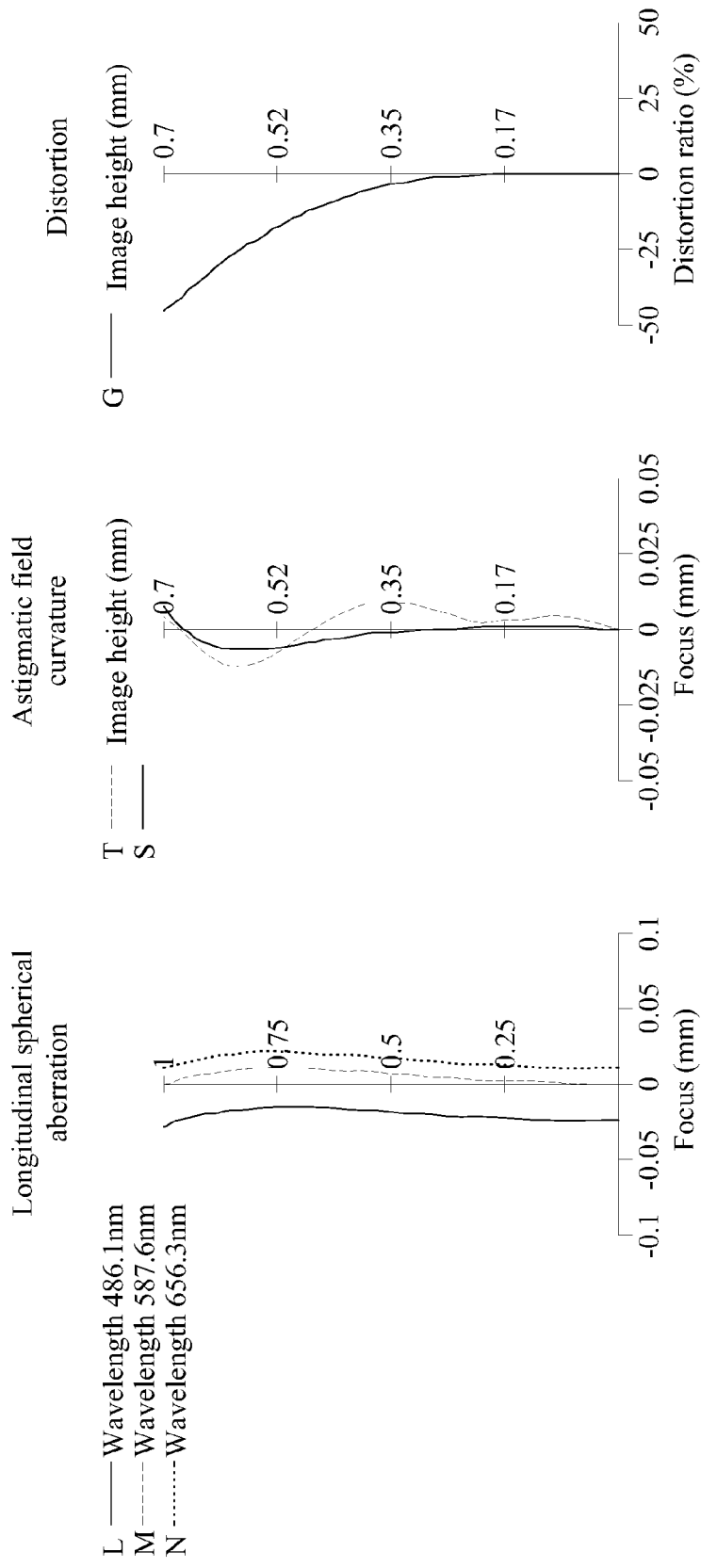

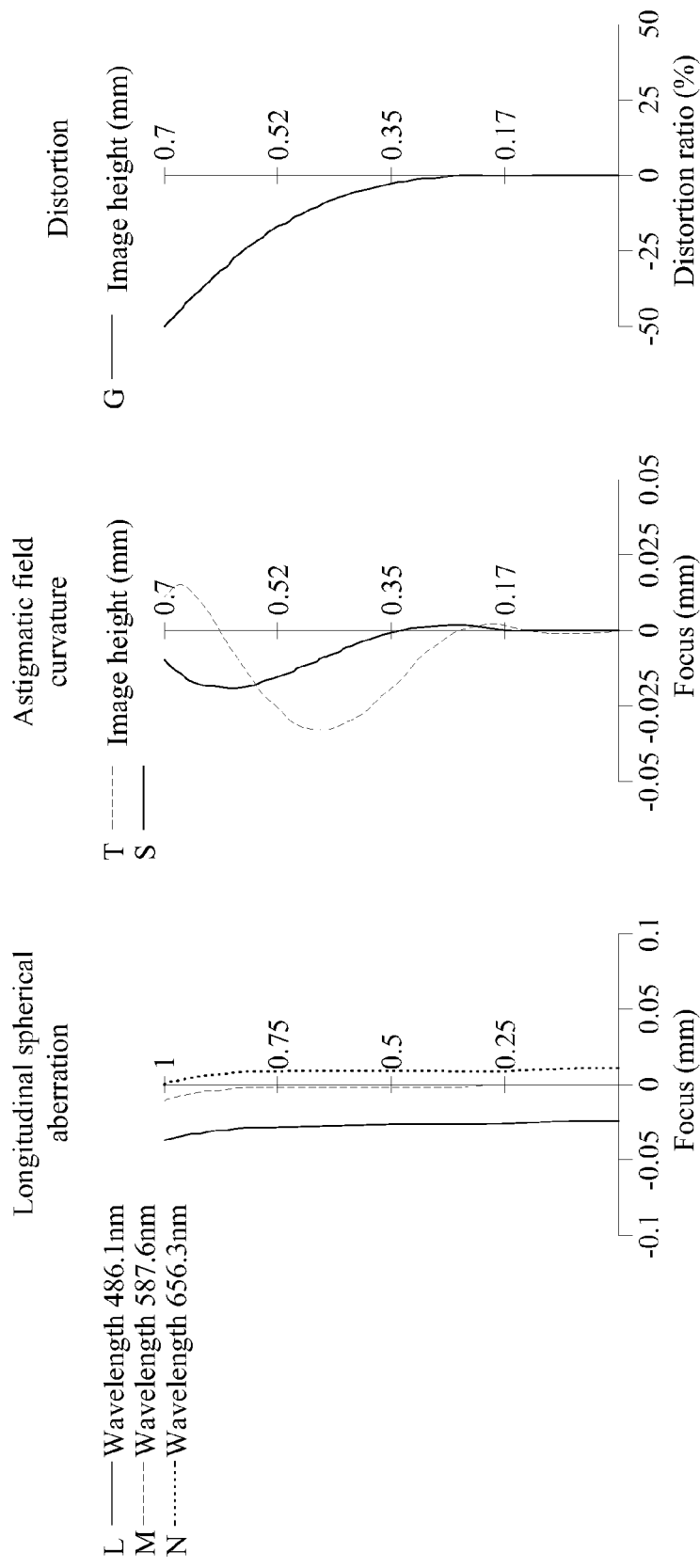

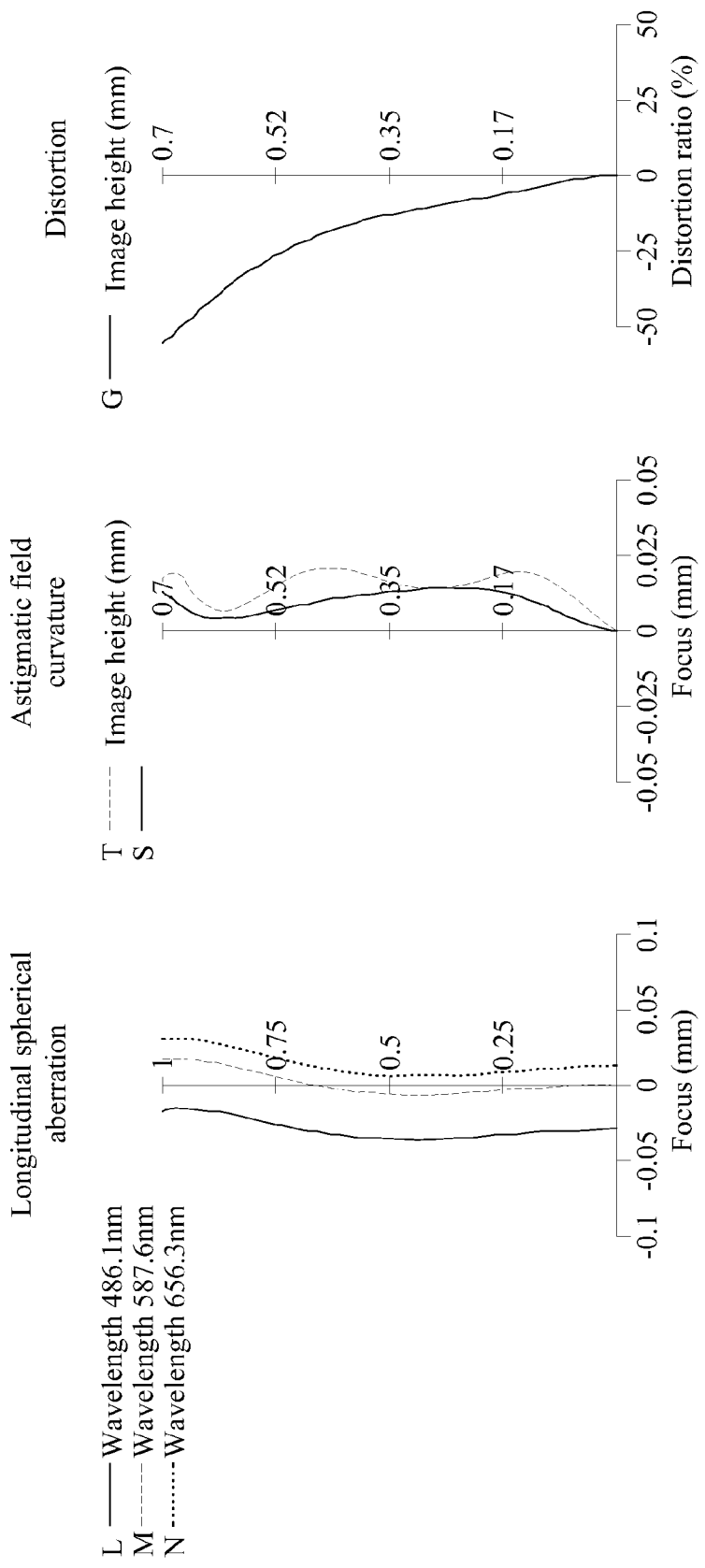

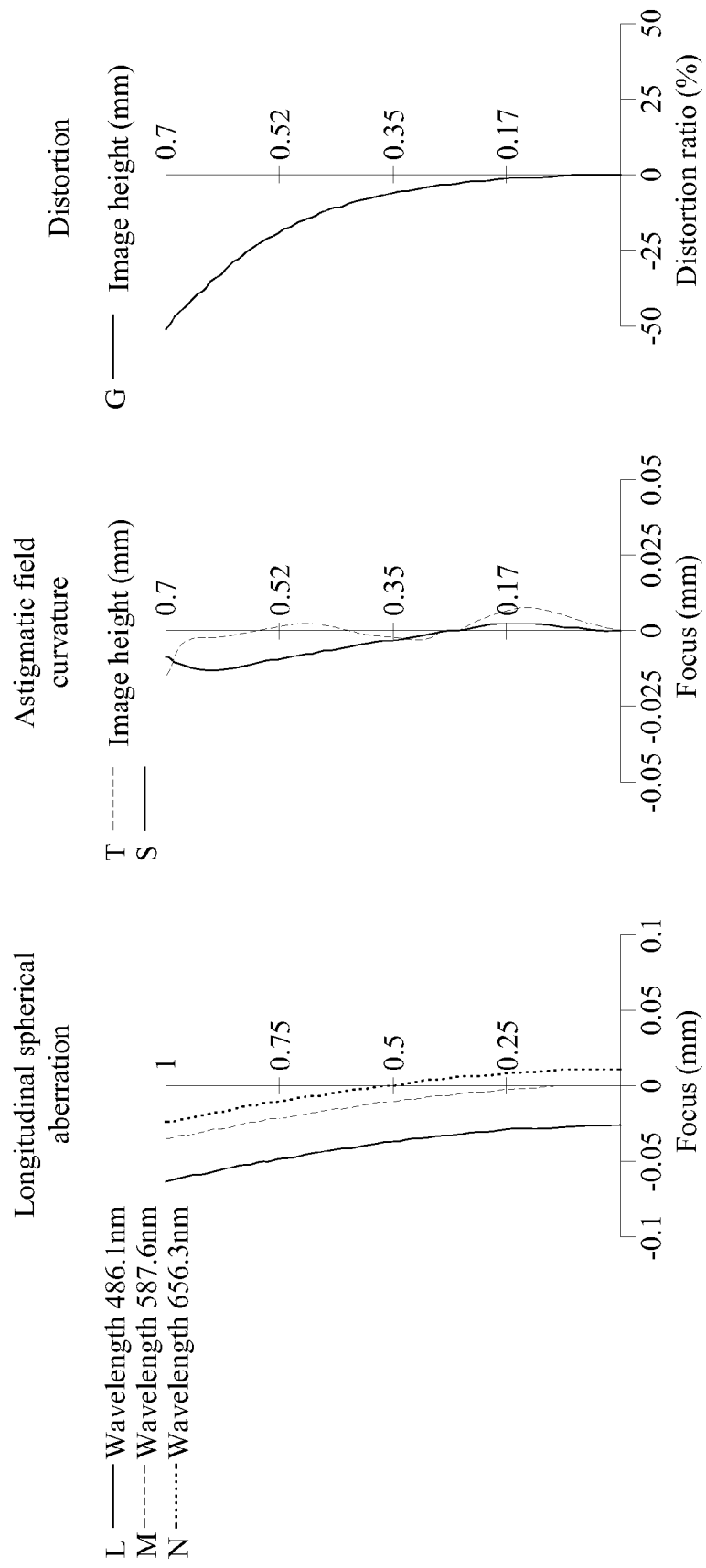

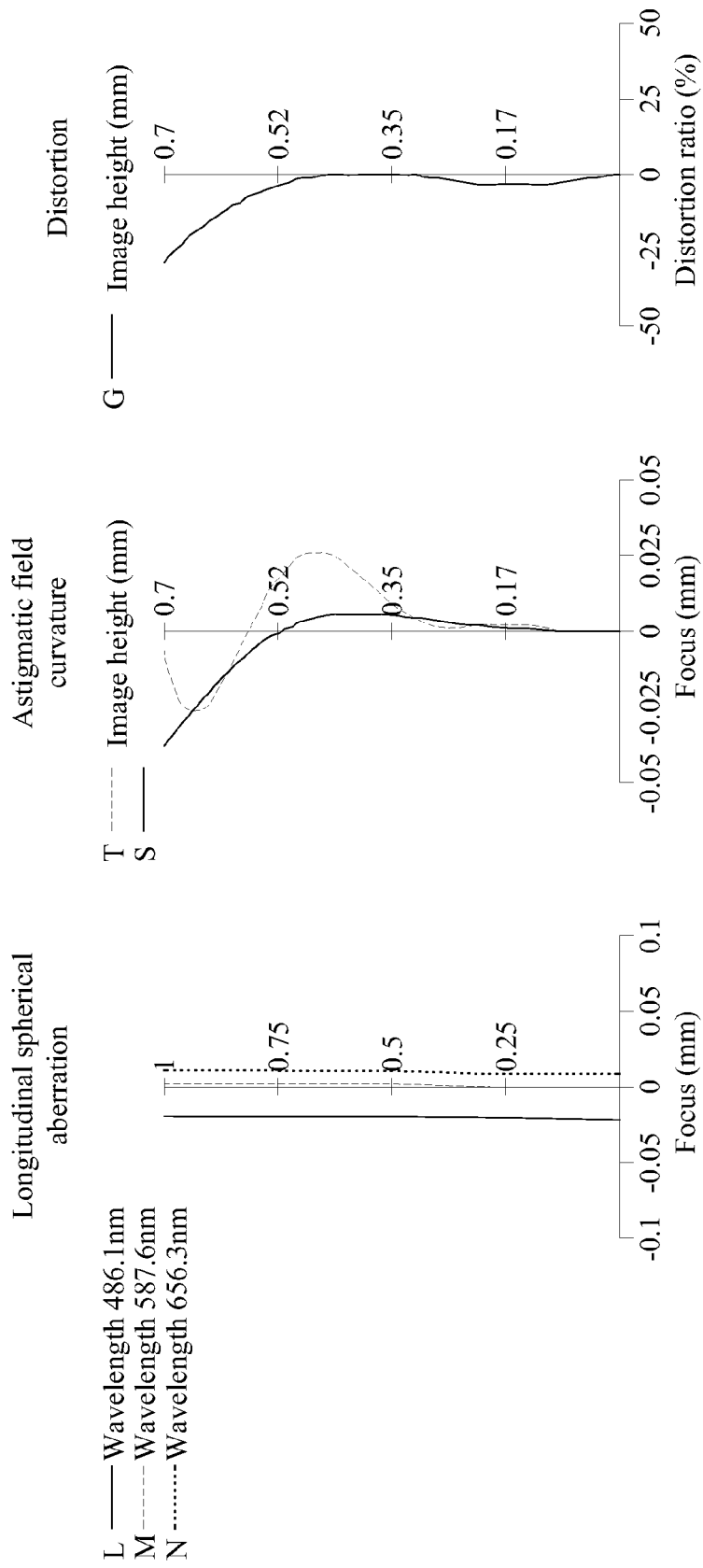

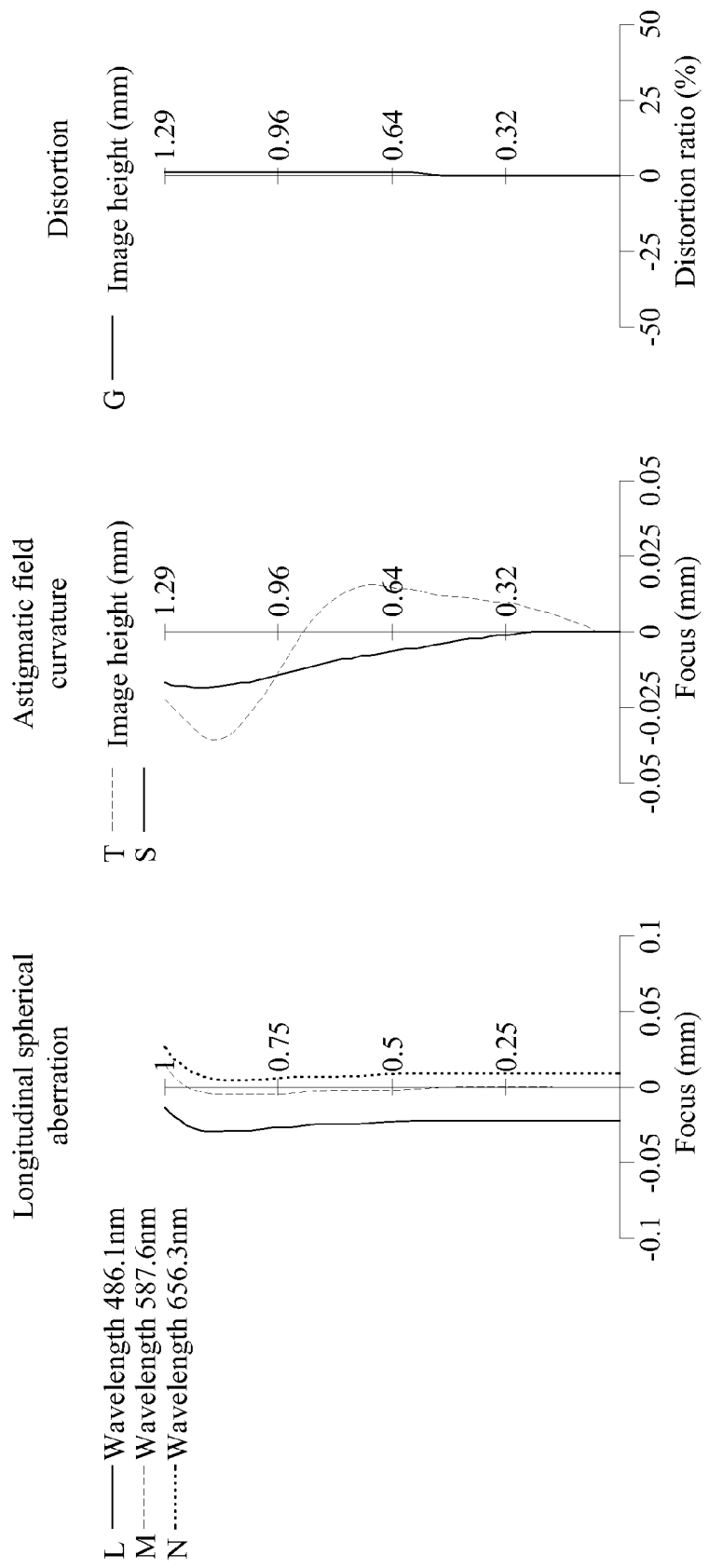

WIDE VIEWING ANGLE OPTICAL LENS ASSEMBLY

CROSS-REFERENCE TO RELATED APPLICATIONS

This non-provisional application claims priority under 35 U.S.C. §119(a) on Patent Application No(s). 100106055 filed in Taiwan, R.O.C. on Feb. 23, 2011, the entire contents of which are hereby incorporated by reference.

BACKGROUND OF THE INVENTION

1. Field of Invention

The present invention relates to an optical lens assembly, and more particularly to a wide viewing angle optical lens assembly having multiple lens elements.

2. Related Prior Art

In recent years, with the prosperity of wide viewing angle optical lens assemblies, the demands for the compact photographing cameras are boosted exponentially. The photo-sensing device, e.g. a sensor, of an ordinary photographing camera is commonly selected from a charge coupled device (CCD) and a complementary metal-oxide semiconductor (CMOS) device. In addition, as the advancing semiconductor manufacturing technology enables the minimization of the pixel size of sensors and the development of electronic products is heading toward full functionality and getting light, thin, short and small, and the standards for the image quality of the photographing optical lens assemblies are rapidly raised.

U.S. Pat. No. 6,490,102 provides a topical lens configuration with a three-element lens assembly comprising a glass lens and a plastic lens, where a third lens element is glass, such that the freedom of correcting the aberration of the topical lens assembly is reduced, thereby the image quality becomes difficult to control. Furthermore, U.S. Pat. No. 7,262,925 provides another topical lens configuration with a three-element lens assembly, where an aperture stop is disposed between a first lens element and a second lens element, such that the topical lens can not meet the requirement of the miniaturization because of the increased length of the topical lens assembly.

SUMMARY OF THE INVENTION

In view of the aforementioned problems and the market demand, the present invention provides a wide viewing angle optical lens assembly with compact size, greater viewing angle and superior imaging quality.

According to an embodiment of the present invention, a wide viewing angle optical lens assembly comprising, in order from an object side to an image side, a first lens element with negative refractive power having a convex object-side surface and a concave image-side surface, a second lens element with positive refractive power having a convex object-side surface and a third lens element with positive refractive power having a convex image-side surface is disclosed.

Wherein, the first lens element, the second lens element, and the third lens element are non-cemented. Near an optical axis, $f_2$ is the focal length of the second lens element, $f_3$ is the focal length of the third lens element, $R_1$ is the curvature radius of the object-side surface of the first lens element, $R_5$ is the curvature radius of an object-side surface of the third lens element, $R_6$ is the curvature radius of the image-side surface of the third lens element, and the wide viewing angle optical lens assembly satisfies the following relations:

$0.6 < f_2/f_3 < 1.3$ (Condition 2)

$0 < R_1/|R_5| < 1.0$ (Condition 2)

$0 < (R_5+R_6)/(R_5-R_6) < 3.0$ (Condition 3)

According to another embodiment of the present invention, a wide viewing angle optical lens assembly comprising, in order from an object side to an image side, a first lens element with negative refractive power having a convex object-side surface and a concave image-side surface, a second lens element with positive refractive power having a convex object-side surface and a third lens element with positive refractive power having a convex image-side surface is disclosed.

Wherein, the first lens element, the second lens element, and the third lens element are non-cemented. Near an optical axis, the wide viewing angle optical lens assembly further comprises a stop and an image plane and f is the focal length of the wide viewing angle optical lens assembly. $f_2$ is the focal length of the second lens element, $f_3$ is the focal length of the third lens element, $R_2$ is the curvature radius of the image-side surface of the first lens element, the axial distance from the stop to the image plane is SL, the axial distance from the object-side surface of the first lens element to the image plane is TTL, and the wide viewing angle optical lens assembly satisfies the following relations:

$0.6 < f_2/f_3 < 1.3$ (Condition 1)

$0 < R_2/f < 0.6$ (Condition 4)

$0.3 < SL/TTL < 0.68$ (Condition 5)

According to another embodiment of the present invention, a wide viewing angle optical lens assembly comprising, in order from an object side to an image side, a first lens element with negative refractive power having a convex object-side surface and a concave image-side surface, a second lens element with positive refractive power having a convex object-side surface and a third lens element with positive refractive power having a convex image-side surface is disclosed. Wherein, the first lens element is plastic and there is at least one inflection point on the first lens element. At least one of the object-side and the image-side surfaces of the first lens element are aspheric.

Wherein, the first lens element, the second lens element, and the third lens element are non-cemented. Near an optical axis, the wide viewing angle optical lens assembly further comprises a stop and an image plane and f is the focal length of the wide viewing angle optical lens assembly. $R_2$ is the curvature radius of the image-side surface of the first lens element, $R_3$ is the curvature radius of the object-side surface of the second lens element, $R_6$ is the curvature radius of the image-side surface of the third lens element, the axial distance from the stop to the image plane is SL, the axial distance from the object-side surface of the first lens element to the image plane is TTL, and the wide viewing angle optical lens assembly satisfies the following relations:

$0 < R_2/f < 0.6$ (Condition 4)

$0.3 < SL/TTL < 0.68$ (Condition 5)

$-2.5 < R_3/R_6 < -0.7$ (Condition 6)

In the above-mentioned wide viewing angle optical lens assembly, the first lens element with negative refractive power provides a greater angle of view. The second lens element with positive refractive power provides partial refractive power needed by the wide viewing angle optical lens assembly and shortens the total optical length of the same. The third lens element with positive refractive power works with the second lens element with the positive refractive power for effectively reducing the sensitivity of the wide viewing angle optical lens assembly.

Furthermore, since the second lens element has the convex object-side surface, the positive refractive power of the second lens element is enhanced, thereby reducing the total optical length of the wide viewing angle optical lens assembly. In addition, when the third lens element has the convex image-side surface, the total optical length of the wide viewing angle optical lens assembly may also be shortened.

When the wide viewing angle optical lens assembly satisfies (Condition 1), the allocation of the refractive power between the second lens element and the third lens element is proper. When the wide viewing angle optical lens assembly satisfies (Condition 2), the ratio of the curvature radii between the object-side surface of the first lens element and the object-side surface of the third lens element are proper for correcting the aberration. When the wide viewing angle optical lens assembly satisfies (Condition 3), the curvature radii of the third lens element are proper, thereby enhancing the positive refractive power and reducing the aberration. When the wide viewing angle optical lens assembly satisfies (Condition 4), the curvature radius of the object-side surface of the first lens element is proper, thereby correcting the aberration. When the wide viewing angle optical lens assembly satisfies (Condition 5), an improved wide field angle of the wide viewing angle optical lens assembly can be favorably achieved. When the wide viewing angle optical lens assembly satisfies (Condition 6), the ratio of the curvature radii between the second lens element and the third lens element are proper, thereby reducing the distance from the second lens element to the third lens element.

BRIEF DESCRIPTION OF THE DRAWINGS

The present invention will become more fully understood from the following detailed description when taken in connection with the accompanying drawings, which show, for the purpose of illustrations only, and thus do not limit other possible embodiments derived from the spirit of the present invention, and wherein:

FIG. 2B is a schematic view of longitudinal spherical aberration curves when the lights having wavelengths of 486.1 nm, 587.6 nm, and 656.3 nm are respectively projected in the wide viewing angle optical lens assembly in FIG. 2A;

FIG. 2C is a schematic view of astigmatic field curves when the light having the wavelength of 587.6 nm is projected in the wide viewing angle optical lens assembly in FIG. 2A;

FIG. 2D is a schematic view of a distortion curve when the light having the wavelength of 587.6 nm is projected in the wide viewing angle optical lens assembly in FIG. 2A;

FIG. 3B is a schematic view of longitudinal spherical aberration curves when the lights having wavelengths of 486.1 nm, 587.6 nm, and 656.3 nm are respectively projected in the wide viewing angle optical lens assembly in FIG. 3A;

FIG. 3C is a schematic view of astigmatic field curves when the light having the wavelength of 587.6 nm is projected in the wide viewing angle optical lens assembly in FIG. 3A;

FIG. 3D is a schematic view of a distortion curve when the light having the wavelength of 587.6 nm is projected in the wide viewing angle optical lens assembly in FIG. 3A;

FIG. 4B is a schematic view of longitudinal spherical aberration curves when the lights having wavelengths of 486.1 nm, 587.6 nm, and 656.3 nm are respectively projected in the wide viewing angle optical lens assembly in FIG. 4A;

FIG. 4C is a schematic view of astigmatic field curves when the light having the wavelength of 587.6 nm is projected in the wide viewing angle optical lens assembly in FIG. 4A;

FIG. 4D is a schematic view of a distortion curve when the light having the wavelength of 587.6 nm is projected in the wide viewing angle optical lens assembly in FIG. 4A;

FIG. 5B is a schematic view of longitudinal spherical aberration curves when the lights having wavelengths of 486.1 nm, 587.6 nm, and 656.3 nm are respectively projected in the wide viewing angle optical lens assembly in FIG. 5A;

FIG. 5C is a schematic view of astigmatic field curves when the light having the wavelength of 587.6 nm is projected in the wide viewing angle optical lens assembly in FIG. 5A;

FIG. 5D is a schematic view of a distortion curve when the light having the wavelength of 587.6 nm is projected in the wide viewing angle optical lens assembly in FIG. 5A;

FIG. 6B is a schematic view of longitudinal spherical aberration curves when the lights having wavelengths of 486.1 nm, 587.6 nm, and 656.3 nm are respectively projected in the wide viewing angle optical lens assembly in FIG. 6A;

FIG. 6C is a schematic view of astigmatic field curves when the light having the wavelength of 587.6 nm is projected in the wide viewing angle optical lens assembly in FIG. 6A;

FIG. 6D is a schematic view of a distortion curve when the light having the wavelength of 587.6 nm is projected in the wide viewing angle optical lens assembly in FIG. 6A;

FIG. 7B is a schematic view of longitudinal spherical aberration curves when the lights having wavelengths of 486.1 nm, 587.6 nm, and 656.3 nm are respectively projected in the wide viewing angle optical lens assembly in FIG. 7A;

FIG. 7C is a schematic view of astigmatic field curves when the light having the wavelength of 587.6 nm is projected in the wide viewing angle optical lens assembly in FIG. 7A;

FIG. 7D is a schematic view of a distortion curve when the light having the wavelength of 587.6 nm is projected in the wide viewing angle optical lens assembly in FIG. 7A;

FIG. 9B is a schematic view of longitudinal spherical aberration curves when the lights having wavelengths of 486.1 nm, 587.6 nm, and 656.3 nm are respectively projected in the wide viewing angle optical lens assembly in FIG. 9A;

FIG. 9C is a schematic view of astigmatic field curves when the light having the wavelength of 587.6 nm is projected in the wide viewing angle optical lens assembly in FIG. 9A;

FIG. 9D is a schematic view of a distortion curve when the light having the wavelength of 587.6 nm is projected in the wide viewing angle optical lens assembly in FIG. 9A;

FIG. 10B is a schematic view of longitudinal spherical aberration curves when the lights having wavelengths of 486.1 nm, 587.6 nm, and 656.3 nm are respectively projected in the wide viewing angle optical lens assembly in FIG. 10A;

FIG. 10C is a schematic view of astigmatic field curves when the light having the wavelength of 587.6 nm is projected in the wide viewing angle optical lens assembly in FIG. 10A; and FIG. 10D is a schematic view of a distortion curve when the light having the wavelength of 587.6 nm is projected in the wide viewing angle optical lens assembly in FIG. 10A.

DETAILED DESCRIPTION OF THE INVENTION

Figure 1A:
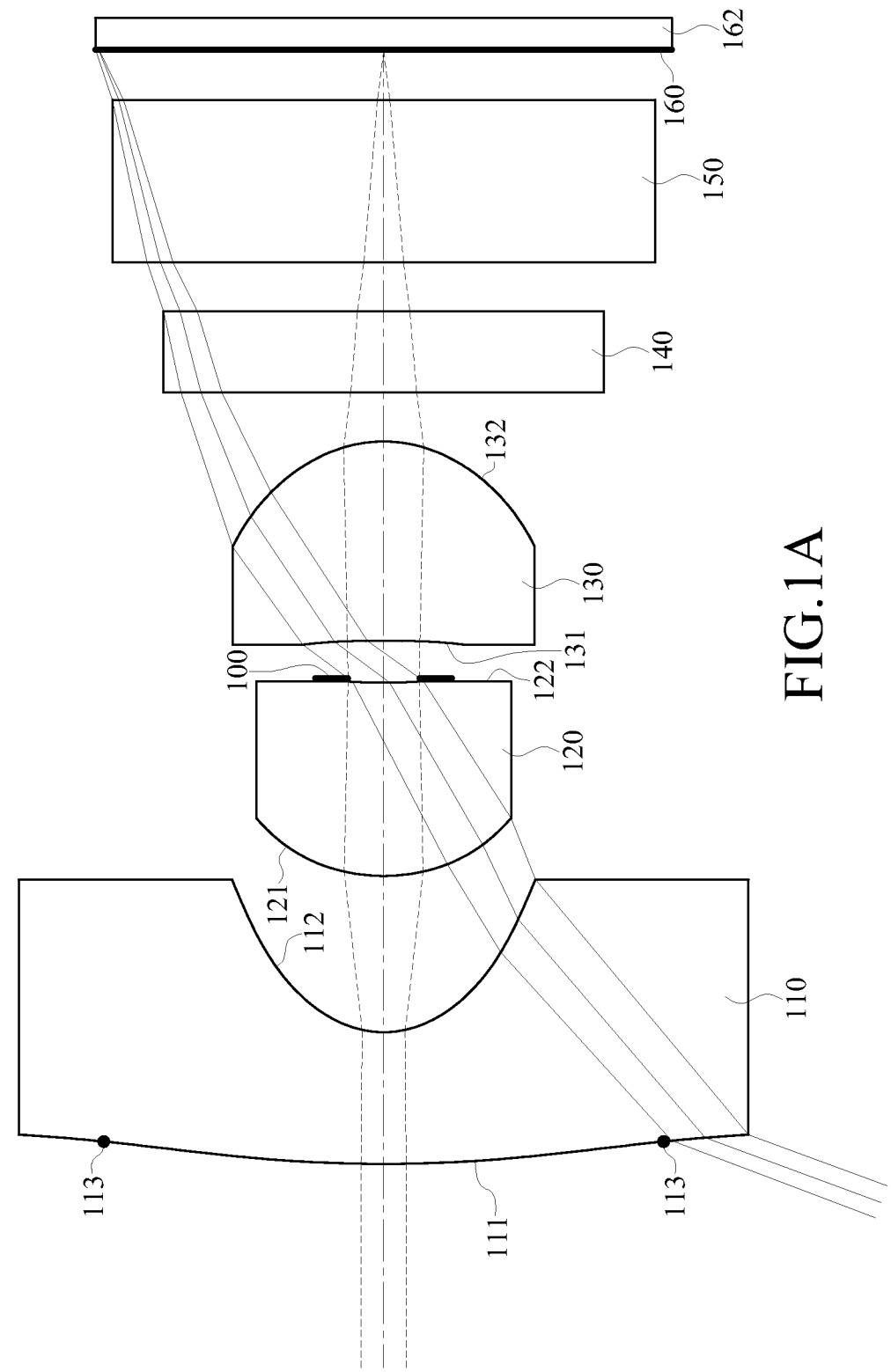
FIG. 1A is a schematic structural view of a first embodiment of a wide viewing angle optical lens assembly according to the present invention.

One of the embodiments of the wide viewing angle optical lens assemblies of the present invention is described with FIG. 1A as an example, to illustrate the lens combinations, the configuration relationships and the conditions of the wide viewing angle optical lens assemblies that are commonly disclosed by the embodiments of the invention. The differences between the embodiments will be described in detail in embodiments other than the embodiment described in FIG. 1.

Taking FIG. 1A as an example, the wide viewing angle optical lens assembly 10, from an object side to an image side along an optical axis (from left to right in FIG. 1A) in sequence, comprises a first lens element 110 with negative refractive power, a second lens element 120 with positive refractive power and a third lens element 130 with positive refractive power.

The first lens element 110 comprising a convex object-side surface 111 and a concave image-side surface 112 is plastic and has at least one inflection point 113. At least one of the object-side surface 111 and the image-side surface 112 of the first lens element 110 are aspheric.

The second lens element 120 comprises a convex object-side surface 121 and an image-side surface 122.

The third lens element 130 comprises an object-side surface 131 and a convex image-side surface 132.

It should be noted that the first lens element 110, the second lens element 120, and the third lens element 130 are non-cemented.

Furthermore, the wide viewing angle optical lens assembly 10 further comprises an aperture stop 100 disposed between the second lens element 120 and the third lens element 130. The wide viewing angle optical lens assembly 10 further comprises an infrared filter 140, a cover glass 150, an image plane 160, and an image sensor 162 after the third lens element 130 in sequence. Wherein, the image sensor 162 is disposed on the image plane 160.

The wide viewing angle optical lens assembly 10 of the present invention satisfies the following relations:

$$0.6 < f_2/f_3 < 1.3 \qquad \text{(Condition 1)}$$

$$0 < R_1/|R_5| < 1.0 \qquad \text{(Condition 1)}$$

$$0 < (R_5+R_6)/(R_5-R_6) < 3.0 \qquad \text{(Condition 3)}$$

$$0 < R_2/f < 0.6 \qquad \text{(Condition 4)}$$

$$0.3 < SL/TTL < 0.68 \qquad \text{(Condition 5)}$$

$$-2.5 < R_3/R_6 < -0.7 \qquad \text{(Condition 6)}$$

Wherein, near the optical axis, f is the focal length of the wide viewing angle optical lens assembly 10, $f_2$ is the focal length of the second lens element 120, $f_3$ is the focal length of the third lens element 130, $R_1$ is the curvature radius of the object-side surface 111 of the first lens element 110, $R_2$ is the curvature radius of the image-side surface 112 of the first lens element 110, $R_3$ is the curvature radius of the object-side surface 121 of the second lens element 120, $R_5$ is the curvature radius of the object-side surface 131 of the third lens element 130, $R_6$ is the curvature radius of the image-side surface 132 of the third lens element 130, SL is the axial distance from the aperture stop 100 to the image plane 160, TTL is the axial distance from the object-side surface 111 of the first lens element 110 to the image plane 160.

When the wide viewing angle optical lens assembly 10 satisfies (Condition 1), the allocation of the refractive power between the second lens element 120 and the third lens element 130 is proper. The appropriate range satisfying (Condition 1) may be $0.8 < f_2/f_3 < 1.2$. When the wide viewing angle optical lens assembly 10 satisfies (Condition 2), the curvature radius of the object-side surface 131 of the third lens element 130 is proper for correcting the aberration. When the wide viewing angle optical lens assembly 10 satisfies (Condition 3), the curvature radii of the third lens element 130 are proper, thereby enhancing the positive refractive power and reducing the aberration. The appropriate range satisfying (Condition 3) may be $0.4 < (R_5+R_6)/(R_5-R_6) < 2.0$. When the wide viewing angle optical lens assembly 10 satisfies (Condition 4), the curvature radius of the object-side surface 112 of the first lens element 110 is proper for correcting the aberration. When the wide viewing angle optical lens assembly 10 satisfies (Condition 5), an improved wide field angle of the wide viewing angle optical lens assembly 10 can favorably be achieved. When the wide viewing angle optical lens assembly 10 satisfies (Condition 6), the ratio of the curvature radii between the second lens element 120 and the third lens element 130 are proper, thereby reducing the distance from the second lens element 120 to the third lens element 130. The appropriate range satisfying (Condition 6) may be $-1.5 < R_3/R_6 < -0.7$.

Furthermore, the wide viewing angle optical lens assembly 10 also satisfies the following relations:

$-0.5 < R_3/R_4 < 0.5$ (Condition 7)

$HFOV > 60$ (Condition 8)

Wherein, near the optical axis, $R_3$ is the curvature radius of the object-side surface 121 of the second lens element 120, $R_4$ is the curvature radius of the image-side surface 122 of the second lens element 120, and HFOV is a half of the maximal viewing angle in the wide viewing angle optical lens assembly 10.

When the wide viewing angle optical lens assembly 10 satisfies (Condition 7), the curvature radii of the second lens element 120 are proper, thereby correcting the aberration effectively. When the wide viewing angle optical lens assembly 10 satisfies (Condition 8), the wide viewing angle optical lens assembly 10 can obtain a greater angle of view.

Furthermore, there is at least one inflection point 113 on the first lens element 110, such that the angle at which the light is projected onto the image sensor 162 from the off-axis field can be effectively reduced to further correct the off-axis aberrations.

In the wide viewing angle optical lens assembly of the present invention, lenses may be made of glass or plastic. If a lens is made of glass, there is more freedom in distributing the refractive power of the wide viewing angle optical lens assembly. If a lens is made of plastic, the production cost is effectively reduced. In addition, the surfaces of the lenses can be easily made into aspherical profiles, allowing more design parameter freedom which can reduce aberrations and total number of lens elements, so that the total track length of the assembly can be reduced effectively.

In the wide viewing angle optical lens assembly of the present invention, a convex surface of a lens means the surface of the lens is convex at a paraxial site. A concave surface of a lens means the surface of the lens is concave at a paraxial site. In addition, at least one stop may be disposed within the wide viewing angle optical lens assembly to lower the occurrence of unwanted rays (such as glare stops), to adjust the field of view (such as field stops), or for other means to improve the image quality.

In the wide viewing angle optical lens assembly of the present invention, the specific schemes are further described with the following embodiments. Parameters in the embodiments are defined as follows. Fno is the f-number of the wide viewing angle optical lens assembly, and HFOV is a half of the maximal viewing angle in the wide viewing angle optical lens assembly. The aspheric surface in the embodiments may be represented by, but not limited to, the following aspheric surface equation (Formula ASP):

$$X(Y) = \frac{(Y^2/R)}{(1+\sqrt{1-(1+k)*(Y/R)^2})} + \sum_i (Ai)*(Y^i)$$

Wherein X is the height of a point on the aspheric surface at a distance Y from the optical axis relative to the tangential plane at the aspheric surface vertex, Y is the distance from the point on the curve of the aspheric surface to the optical axis, k is a cone factor, Ai is an $i^{th}$ order aspheric surface coefficient, and in the embodiments, i may be, but is not limited to, 4, 6, 8, 10 and 12.

The First Embodiment

Embodiment 1

FIG. 1A is a schematic structural view of a first embodiment of a wide viewing angle optical lens assembly according to the present invention. In this embodiment, for example, the wavelength of the light received by the wide viewing angle optical lens assembly 10 is 587.6 nm, but the wavelength of the light received by the wide viewing angle optical lens assembly 10 may be adjusted according to actual requirements, and is not limited to the wavelength value mentioned above.

According to this embodiment of the present invention, the first lens element 110 has the negative refractive power, the second lens element 120 has the positive refractive power, and the third lens element 130 has the positive refractive power. Wherein, the object-side surface 111 of the first lens element 110 is convex and there are two inflection points 113 on the object-side surface 111 of the first lens element 110. The image-side surface 112 of the first lens element 110 is concave. The object-side surface 121 of the second lens element 120 is convex. The image-side surface 132 of the third lens element 130 is convex.

The detailed data of the wide viewing angle optical lens assembly 10 is as shown in Table 1-1 below.

TABLE 1-1

(Embodiment 1)
f = 0.44 mm, Fno = 4.00, HFOV = 69.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.430300 (ASP) | 0.324 | Plastic | 1.544 | 55.9 | −0.50 |
| 2 | | 0.244580 (ASP) | 0.384 | | | | |
| 3 | Lens 2 | 0.447710 (ASP) | 0.475 | Plastic | 1.634 | 23.8 | 0.87 |
| 4 | | 1.421600 (ASP) | 0.011 | | | | |
| 5 | Ape. Stop | Plano | 0.092 | | | | |
| 6 | Lens 3 | −4.171000 (ASP) | 0.490 | Plastic | 1.514 | 56.8 | 0.68 |
| 7 | | −0.333250 (ASP) | 0.120 | | | | |
| 8 | IR-filter | Plano | 0.200 | Glass | 1.517 | 64.2 | — |
| 9 | | Plano | 0.120 | | | | |
| 10 | Cover | Plano | 0.400 | Glass | 1.517 | 64.2 | — |
| 11 | | Plano | 0.124 | | | | |
| 12 | Image | Plano | — | | | | |

Note:
Reference wavelength is d-line 587.6 nm

Furthermore, the first lens element 110, the second lens element 120, and the third lens element 130 are aspheric, and the aspheric surfaces may satisfy Formula ASP, but are not limited thereto. As for the parameters of the aspheric surfaces, reference is made to Table 1-2 below.

TABLE 1-2

Aspheric Coefficients

| Surface# | 1 | 2 | 3 | 4 | 6 | 7 |
|---|---|---|---|---|---|---|
| k | 1.88843E+00 | −9.57219E−01 | −1.55089E+00 | −1.00000E+00 | 5.79795E+01 | −7.78663E−01 |
| $A_4$ | −6.25084E−03 | 3.27896E+00 | 2.97762E+00 | 7.14909E+00 | −3.55947E+00 | −6.49789E−01 |
| $A_6$ | −2.29665E−01 | −3.37180E+01 | 1.10426E+01 | −1.35237E+03 | −1.02957E+01 | 1.61031E+00 |
| $A_8$ | 2.29131E−01 | 7.07540E+02 | 1.21348E+02 | 1.69735E+05 | 8.47371E+02 | −6.28308E+01 |
| $A_{10}$ | −7.18359E−02 | −2.93064E+03 | −1.15225E+03 | −7.04211E+06 | −5.50679E+03 | −1.04925E+02 |

The content of Table 1-3 may be deduced from Table 1-1.

TABLE 1-3

(Embodiment 1)

| f (mm) | 0.44 | $R_3/R_6$ | −1.34 |
|---|---|---|---|
| Fno | 4.00 | $(R_5 + R_6)/(R_5 − R_6)$ | 1.17 |
| HFOV(deg.) | 69.8 | $R_2/f$ | 0.56 |
| $R_1/|R_5|$ | 0.82 | $f_2/f_3$ | 1.28 |
| $R_3/R_4$ | 0.31 | SL/TTL | 0.53 |

In this embodiment, the $f_2/f_3$ is 1.28, which satisfies the range of (Condition 1). The $R_1/|R_5|$ is 0.82, which satisfies the range of (Condition 2). The $(R_5+R_6)/(R_5−R_6)$ is 1.17, which satisfies the range of (Condition 3). The $R_2/f$ is 0.56, which satisfies the range of (Condition 4). The SL/TTL is 0.53, which satisfies the range of (Condition 5). The $R_3/R_6$ is −1.34, which satisfies the range of (Condition 6). The $R_3/R_4$ is 0.31, which satisfies the range of (Condition 7). The HFOV is 69.8, which satisfies the range of (Condition 8).

Figures 1B, 1C, 1D:
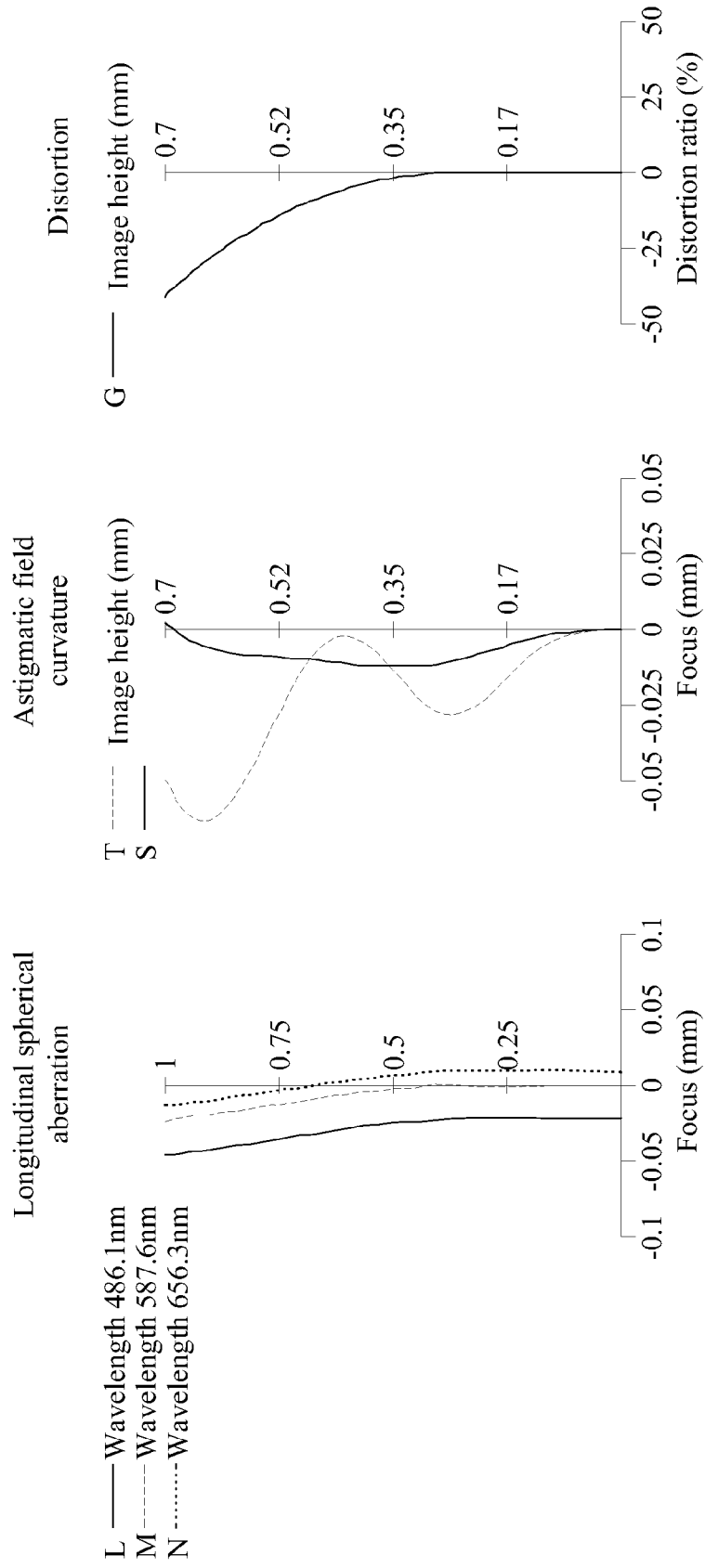
FIG. 1B is a schematic view of longitudinal spherical aberration curves when the lights having wavelengths of 486.1 nm, 587.6 nm, and 656.3 nm are respectively projected in the wide viewing angle optical lens assembly in FIG. 1A.
FIG. 1C is a schematic view of astigmatic field curves when the light having the wavelength of 587.6 nm is projected in the wide viewing angle optical lens assembly in FIG. 1A.
FIG. 1D is a schematic view of a distortion curve when the light having the wavelength of 587.6 nm is projected in the wide viewing angle optical lens assembly in FIG. 1A.

FIG. 1B is a schematic view of longitudinal spherical aberration curves when the lights having wavelengths of 486.1 nm, 587.6 nm, and 656.3 nm are respectively projected in the wide viewing angle optical lens assembly 10 in FIG. 1A. The longitudinal spherical aberration curve of the light having the wavelength of 486.1 nm in the wide viewing angle optical lens assembly 10 is indicated by a solid line L in FIG. 1B. The longitudinal spherical aberration curve of the light having the wavelength of 587.6 nm in the wide viewing angle optical lens assembly 10 is indicated by a dashed line M in FIG. 1B. The longitudinal spherical aberration curve of the light having the wavelength of 656.3 nm in the wide viewing angle optical lens assembly 10 is indicated by a dotted line N in FIG. 1B. Horizontal axis is the focus position (millimeter, mm), and longitudinal axis is the normalized entrance pupil or aperture value. In other words, the differences of the focus positions of the paraxial light (the longitudinal coordinate is close to 0) and the fringe light (the longitudinal coordinate is close to 1) after entering the wide viewing angle optical lens assembly 10 can be seen from the longitudinal spherical aberration curves. It can be known from FIG. 1B that, no matter the wavelength of the light received by the wide viewing angle optical lens assembly 10 of this embodiment is 486.1 nm, 587.6 nm, or 656.3 nm, the longitudinal spherical aberration generated by the wide viewing angle optical lens assembly 10 is within the range of −0.05 mm to 0.02 mm.

In the second embodiment to the tenth embodiment and the schematic views of the longitudinal spherical aberration curves in FIGS. 2B, 3B, 4B, 5B, 6B, 7B, 8B, 9B, and 10B, the solid line L indicates the longitudinal spherical aberration curve of the light having the wavelength of 486.1 nm, the dashed line M indicates the longitudinal spherical aberration curve of the light having the wavelength of 587.6 nm, and the dotted line N indicates the longitudinal spherical aberration curve of the light having the wavelength of 656.3 nm, which will not be repeated herein for sake of conciseness.

FIG. 1C is a schematic view of astigmatic field curves when the light having the wavelength of 587.6 nm is projected in the wide viewing angle optical lens assembly 10 in FIG. 1A. An astigmatic field curve of a tangential plane is a dashed line T in FIG. 1C. An astigmatic field curve of a sagittal plane is a solid line S in FIG. 1C. Horizontal axis is the focus position (mm), and longitudinal axis is the image height (mm). In other words, the differences of the focus positions due to different curvatures of the tangential plane and the sagittal plane can be seen from the astigmatic field curves. It can be known from FIG. 1C that, the astigmatic field curvature of the tangential plane generated when the light having the wavelength of 587.6 nm is projected in the wide viewing angle optical lens assembly 10 is within the range of −0.07 mm to 0.0 mm, and the astigmatic field curvature of the sagittal plane is within the range of −0.015 mm to 0.005 mm.

In the second embodiment to the tenth embodiment and the schematic views of the astigmatic field curves in FIGS. 2C, 3C, 4C, 5C, 6C, 7C, 8C, 9C, and 10C, the solid line S indicates the astigmatic field curve of the sagittal plane, and the dashed line T indicates the astigmatic field curve of the tangential plane, which will not be repeated herein for sake of conciseness.

FIG. 1D is a schematic view of a distortion curve when the light having the wavelength of 587.6 nm is projected in the wide viewing angle optical lens assembly in FIG. 1A. Horizontal axis is the distortion ratio (%), and longitudinal axis is the image height (mm). In other words, the differences of the distortion ratios caused by different image heights can be seen from the distortion curve G. It can be known from FIG. 1D that, the distortion ratio generated when the light having the wavelength of 587.6 nm is projected in the wide viewing angle optical lens assembly 10 is within the range of −40% to 0%. As shown in FIGS. 1B to 1D, the wide viewing angle optical lens assembly 10, designed according to the first embodiment, is capable of greater angle of view.

In the second embodiment to the tenth embodiment and the schematic views of the distortion curves in FIGS. 2D, 3D, 4D, 5D, 6D, 7D, 8D, 9D, and 10D, the solid line G indicates the distortion curve of the light having the wavelength of 587.6 nm, which will not be repeated herein for sake of conciseness.

It should be noted that, the distortion curves and the astigmatic field curves generated when the lights having the wavelength of 486.1 nm and 656.3 nm are projected in the wide viewing angle optical lens assembly 10 are close to the distortion curve and the astigmatic field curves generated when the light having the wavelength of 587.6 nm is projected in the wide viewing angle optical lens assembly 10. In order to prevent the confusion in FIGS. 1C and 1D, the distortion curve and the astigmatic field curves generated when the lights having the wavelength of 486.1 nm and 656.3 nm are projected in the wide viewing angle optical lens assembly 10 are not shown in FIGS. 1C and 1D, and the same is in the second embodiment to the tenth embodiment.

The Second Embodiment

Embodiment 2

Figure 2A:
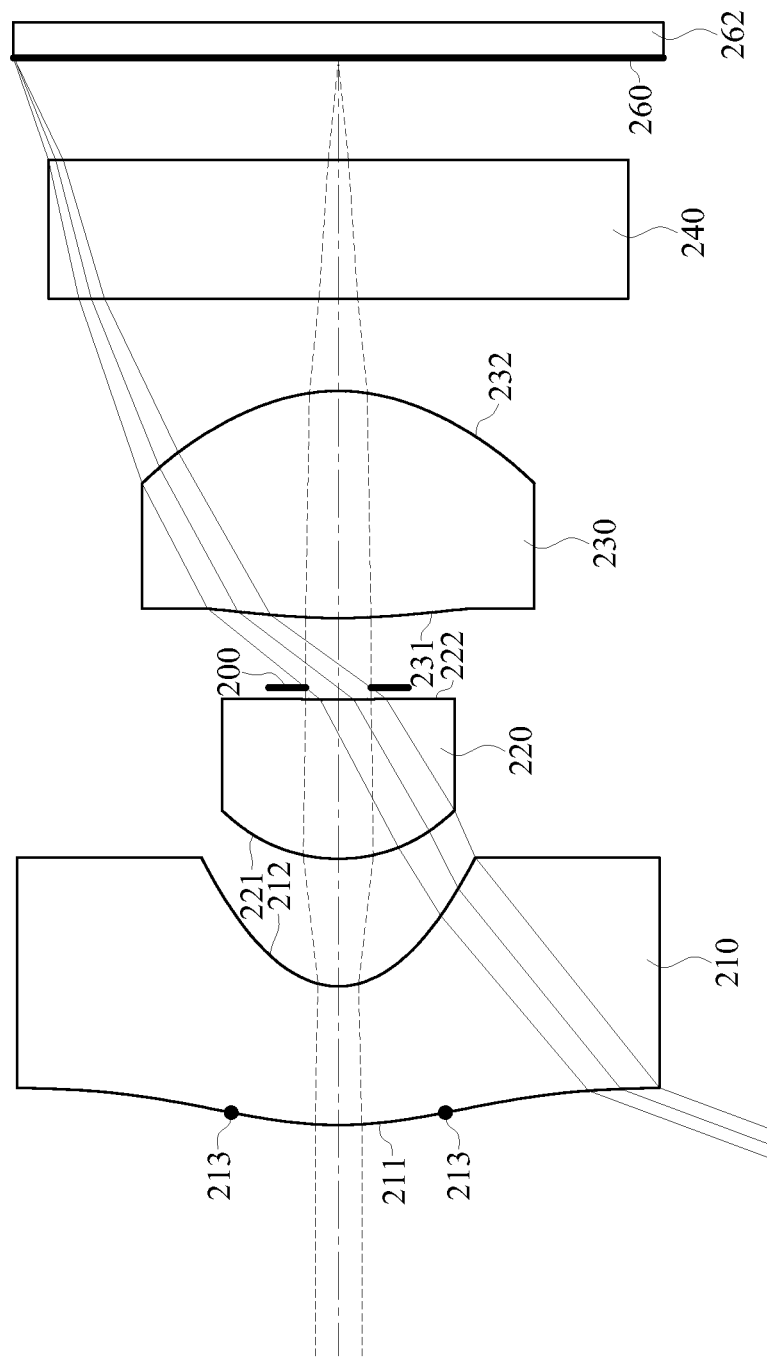
FIG. 2A is a schematic structural view of a second embodiment of the wide viewing angle optical lens assembly according to the present invention.

FIG. 2A is a schematic structural view of a second embodiment of the wide viewing angle optical lens assembly according to the present invention. The specific implementation is substantially the same as that in the first embodiment, and the elements in the second embodiment are the same as those in the first embodiment, so that the element symbols all begin with "2" as the hundredth digit, which represents that the elements have the same function or structure. For sake of conciseness, only the differences are illustrated below, and the similar parts will not be repeated herein.

In this embodiment, for example, the wavelength of the light received by a wide viewing angle optical lens assembly 20 is 587.6 nm, but the wavelength of the light received by the wide viewing angle optical lens assembly 20 may be adjusted according to actual requirements, and is not limited to the wavelength value mentioned above.

According to this embodiment of the present invention, a first lens element 210 has negative refractive power, a second lens element 220 has positive refractive power, and a third lens element 230 has positive refractive power. Wherein, an object-side surface 211 of the first lens element 210 is convex and there are two inflection points 213 on the object-side surface 211 of the first lens element 210. An image-side surface 212 of the first lens element 210 is concave. An object-side surface 221 of the second lens element 220 is convex. An image-side surface 232 of the third lens element 230 is convex.

The detailed data of the wide viewing angle optical lens assembly 20 is as shown in Table 2-1 below.

TABLE 2-1

(Embodiment 2)
f = 0.50 mm, Fno = 5.00, HFOV = 69.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.823420 (ASP) | 0.300 | Plastic | 1.544 | 55.9 | −0.45 |
| 2 | | 0.164750 (ASP) | 0.276 | | | | |
| 3 | Lens 2 | 0.363560 (ASP) | 0.344 | Plastic | 1.634 | 23.8 | 0.64 |
| 4 | | 2.159110 (ASP) | 0.026 | | | | |
| 5 | Ape. Stop | Plano | 0.151 | | | | |
| 6 | Lens 3 | 1.489520 (ASP) | 0.491 | Plastic | 1.514 | 56.8 | 0.70 |
| 7 | | −0.422660 (ASP) | 0.200 | | | | |
| 8 | IR-filter | Plano | 0.300 | Glass | 1.517 | 64.2 | — |
| 9 | | Plano | 0.221 | | | | |
| 10 | Image | Plano | — | | | | |

Note:
Reference wavelength is d-line 587.6 nm

Furthermore, the first lens element 210, the second lens element 220, and the third lens element 230 are aspheric, and the aspheric surfaces may satisfy Formula ASP, but are not limited thereto. As for the parameters of the aspheric surfaces, reference is made to Table 2-2 below.

TABLE 2-2

| Aspheric Coefficients | | | | | | |
|---|---|---|---|---|---|---|
| Surface# | 1 | 2 | 3 | 4 | 6 | 7 |
| k | −8.15433E+00 | −1.36827E+00 | −5.49190E−01 | −1.00000E+00 | −1.18851E−03 | −5.49285E+00 |
| $A_4$ | −7.33094E−01 | 1.01951E+01 | 3.76590E+00 | 1.91646E+00 | −6.72180E−01 | −5.61596E+00 |
| $A_6$ | 7.83379E−01 | 1.36366E+01 | −3.09376E+01 | 4.87924E+02 | −1.72455E+01 | 4.47699E+01 |
| $A_8$ | 4.94383E−02 | −6.66103E+02 | 7.82579E+02 | −6.05374E+04 | 2.14620E+02 | −2.20980E+02 |
| $A_{10}$ | −3.14264E−01 | 3.06923E+03 | −7.11208E+03 | 1.93394E+06 | −7.30630E+02 | 4.20899E+02 |

The content of Table 2-3 may be deduced from Table 2-1.

TABLE 2-3

(Embodiment 2)

| f (mm) | 0.50 | $R_3/R_6$ | −0.86 |
|---|---|---|---|
| Fno | 5.00 | $(R_5 + R_6)/(R_5 − R_6)$ | 0.56 |
| HFOV(deg.) | 69.6 | $R_2/f$ | 0.33 |
| $R_1/|R_5|$ | 0.55 | $f_2/f_3$ | 0.91 |
| $R_3/R_4$ | 0.17 | SL/TTL | 0.57 |

FIG. 2B is a schematic view of longitudinal spherical aberration curves when the lights having wavelengths of 486.1 nm, 587.6 nm, and 656.3 nm are respectively projected in the wide viewing angle optical lens assembly 20 in FIG. 2A. It can be known from FIG. 2B that, no matter the wavelength of the light received by the wide viewing angle optical lens assembly 20 of this embodiment is 486.1 nm, 587.6 nm, or 656.3 nm, the longitudinal spherical aberration generated by the wide viewing angle optical lens assembly 20 is within the range of −0.06 mm to 0.02 mm.

FIG. 2C is a schematic view of astigmatic field curves when the light having the wavelength of 587.6 nm is projected in the wide viewing angle optical lens assembly 20 in FIG. 2A. It can be known from FIG. 2C that, the astigmatic field curvature of the tangential plane generated when the light having the wavelength of 587.6 nm is projected in the wide viewing angle optical lens assembly 20 is within the range of −0.05 mm to 0.005 mm, and the astigmatic field curvature of the sagittal plane is within the range of −0.02 mm to 0.005 mm.

FIG. 2D is a schematic view of a distortion curve when the light having the wavelength of 587.6 nm is projected in the wide viewing angle optical lens assembly in FIG. 2A. It can be known from FIG. 2D that, the distortion ratio generated when the light having the wavelength of 587.6 nm is projected in the wide viewing angle optical lens assembly 20 is within the range of −50% to 0%. As shown in FIGS. 2B to 2D, the wide viewing angle optical lens assembly 20, designed according to the second embodiment, is capable of greater angle of view.

The Third Embodiment

Embodiment 3

Figure 3A:
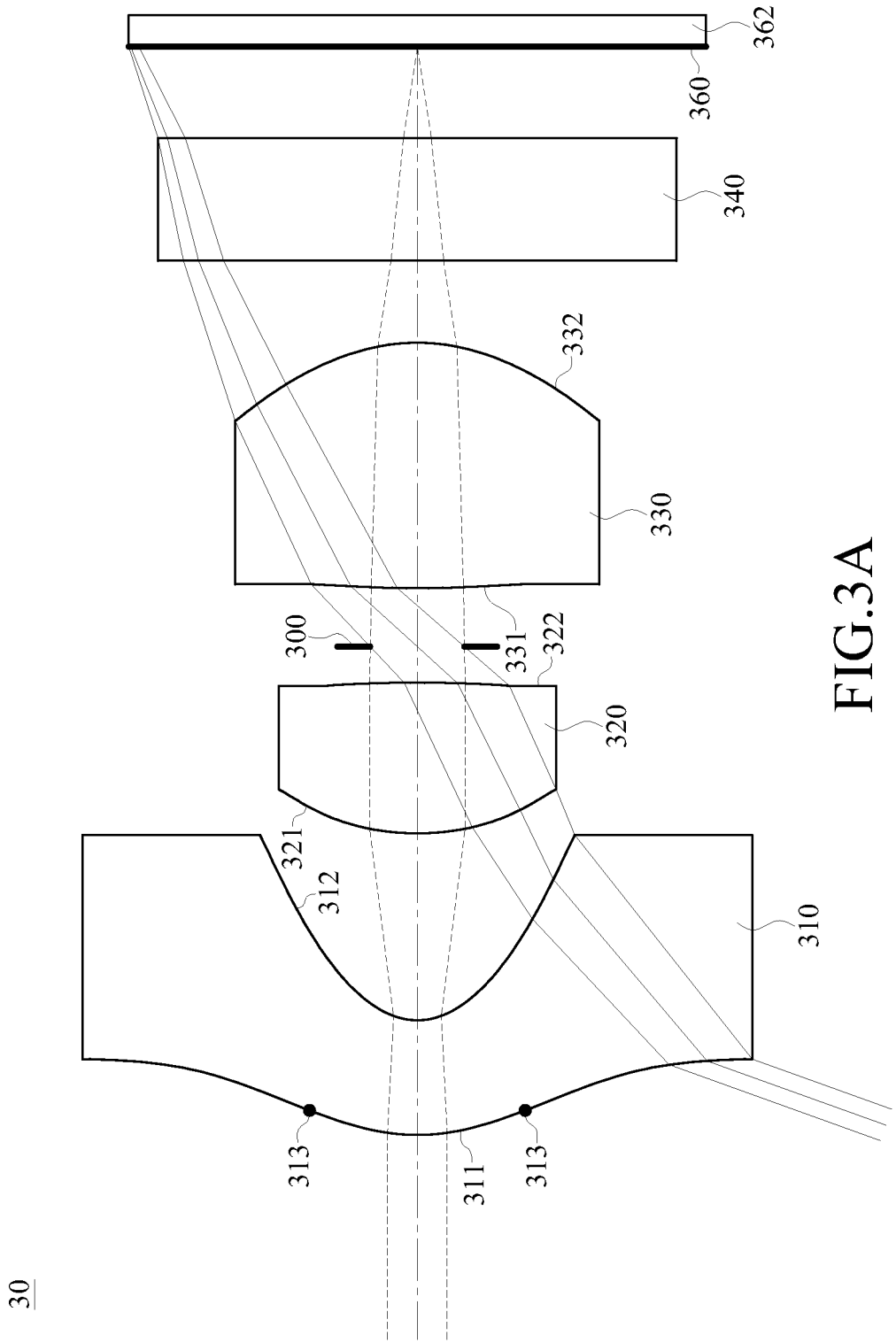
FIG. 3A is a schematic structural view of a third embodiment of the wide viewing angle optical lens assembly according to the present invention.

FIG. 3A is a schematic structural view of a third embodiment of the wide viewing angle optical lens assembly according to the present invention. The specific implementation is substantially the same as that in the first embodiment, and the elements in the third embodiment are the same as those in the first embodiment, so that the element symbols all begin with "3" as the hundredth digit, which represents that the elements have the same function or structure. For sake of conciseness, only the differences are illustrated below, and the similar parts will not be repeated herein.

In this embodiment, for example, the wavelength of the light received by the wide viewing angle optical lens assembly 30 is 587.6 nm, but the wavelength of the light received by the wide viewing angle optical lens assembly 30 may be adjusted according to actual requirements, and is not limited to the wavelength value mentioned above.

According to this embodiment of the present invention, a first lens element 310 has negative refractive power, a second lens element 320 has positive refractive power, and a third lens element 330 has positive refractive power. Wherein, an object-side surface 311 of the first lens element 310 is convex and there are two inflection points 313 on the object-side surface 311 of the first lens element 310. An image-side surface 312 of the first lens element 310 is concave. An object-side surface 321 of the second lens element 320 is convex. An image-side surface 332 of the third lens element 330 is concave.

The detailed data of the wide viewing angle optical lens assembly 30 is as shown in Table 3-1 below.

TABLE 3-1

(Embodiment 3)
f = 0.48 mm, Fno = 3.30, HFOV = 70.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.497380 (ASP) | 0.280 | Plastic | 1.544 | 55.9 | −0.59 |
| 2 | | 0.156730 (ASP) | 0.457 | | | | |
| 3 | Lens 2 | 0.622090 (ASP) | 0.368 | Plastic | 1.634 | 23.8 | 0.85 |
| 4 | | −3.225100 (ASP) | 0.088 | | | | |
| 5 | Ape. Stop | Plano | 0.143 | | | | |
| 6 | Lens 3 | 2.347140 (ASP) | 0.600 | Plastic | 1.514 | 55.9 | 0.79 |
| 7 | | −0.475800 (ASP) | 0.200 | | | | |
| 8 | IR-filter | Plano | 0.300 | Glass | 1.517 | 64.2 | — |
| 9 | | Plano | 0.223 | | | | |
| 10 | Image | Plano | — | | | | |

Note:
Reference wavelength is d-line 587.6 nm

Furthermore, the first lens element 310, the second lens element 320, and the third lens element 330 are aspheric, and the aspheric surfaces may satisfy Formula ASP, but are not limited thereto. As for the parameters of the aspheric surfaces, reference is made to Table 3-2 below.

TABLE 3-2

| | Aspheric Coefficients | | | | | |
|---|---|---|---|---|---|---|
| Surface# | 1 | 2 | 3 | 4 | 6 | 7 |
| k | −2.29634E+00 | −1.54438E+00 | −1.19739E+01 | −1.00000E+00 | −2.19352E+01 | −8.19100E−01 |
| $A_4$ | −9.79760E−01 | 1.41961E+01 | 6.38249E+00 | 1.43284E+00 | −1.82759E−01 | 9.48496E−01 |
| $A_6$ | 3.73232E−01 | −9.07072E+01 | −3.65494E+01 | −1.24097E+01 | −4.77100E+01 | 7.54056E−01 |
| $A_8$ | 8.69685E−01 | 4.63226E+02 | 2.88566E+02 | −6.97980E+02 | 8.57936E+02 | −3.52508E+01 |
| $A_{10}$ | −6.92527E−01 | −1.30371E+03 | −1.58650E+03 | 7.68277E+03 | −4.43421E+03 | 1.19886E+02 |

The content of Table 3-3 may be deduced from Table 3-1.

TABLE 3-3

(Embodiment 3)

| | | | |
|---|---|---|---|
| f (mm) | 0.48 | $R_3/R_6$ | −1.31 |
| Fno | 3.30 | $(R_5 + R_6)/(R_5 − R_6)$ | 0.66 |
| HFOV(deg.) | 70.2 | $R_2/f$ | 0.33 |
| $R_1/|R_5|$ | 0.21 | $f_2/f_3$ | 1.08 |
| $R_3/R_4$ | −0.19 | SL/TTL | 0.53 |

FIG. 3B is a schematic view of longitudinal spherical aberration curves when the lights having a wavelength of 486.1 nm, 587.6 nm, and 656.3 nm are respectively projected in the wide viewing angle optical lens assembly 30 in FIG. 3A. It can be known from FIG. 3B that, no matter the wavelength of the light received by the wide viewing angle optical lens assembly 30 of this embodiment is 486.1 nm, 587.6 nm, or 656.3 nm, the longitudinal spherical aberration generated by the wide viewing angle optical lens assembly 30 is within the range of −0.05 mm to 0.02 mm.

FIG. 3C is a schematic view of astigmatic field curves when the light having the wavelength of 587.6 nm is projected in the wide viewing angle optical lens assembly 30 in FIG. 3A. It can be known from FIG. 3C that, the astigmatic field curvature of the tangential plane generated when the light having the wavelength of 587.6 nm is projected in the wide viewing angle optical lens assembly 30 is within the range of −0.02 mm to 0.02 mm, and the astigmatic field curvature of the sagittal plane is within the range of −0.025 mm to 0.005 mm.

FIG. 3D is a schematic view of a distortion curve when the light having the wavelength of 587.6 nm is projected in the wide viewing angle optical lens assembly in FIG. 3A. It can be known from FIG. 3D that, the distortion ratio generated when the light having the wavelength of 587.6 nm is projected in the wide viewing angle optical lens assembly 30 is within the range of −50% to 0%. As shown in FIGS. 3B to 3D, the wide viewing angle optical lens assembly 30, designed according to the third embodiment, is capable of greater angle of view.

The Fourth Embodiment

Embodiment 4

Figure 4A:
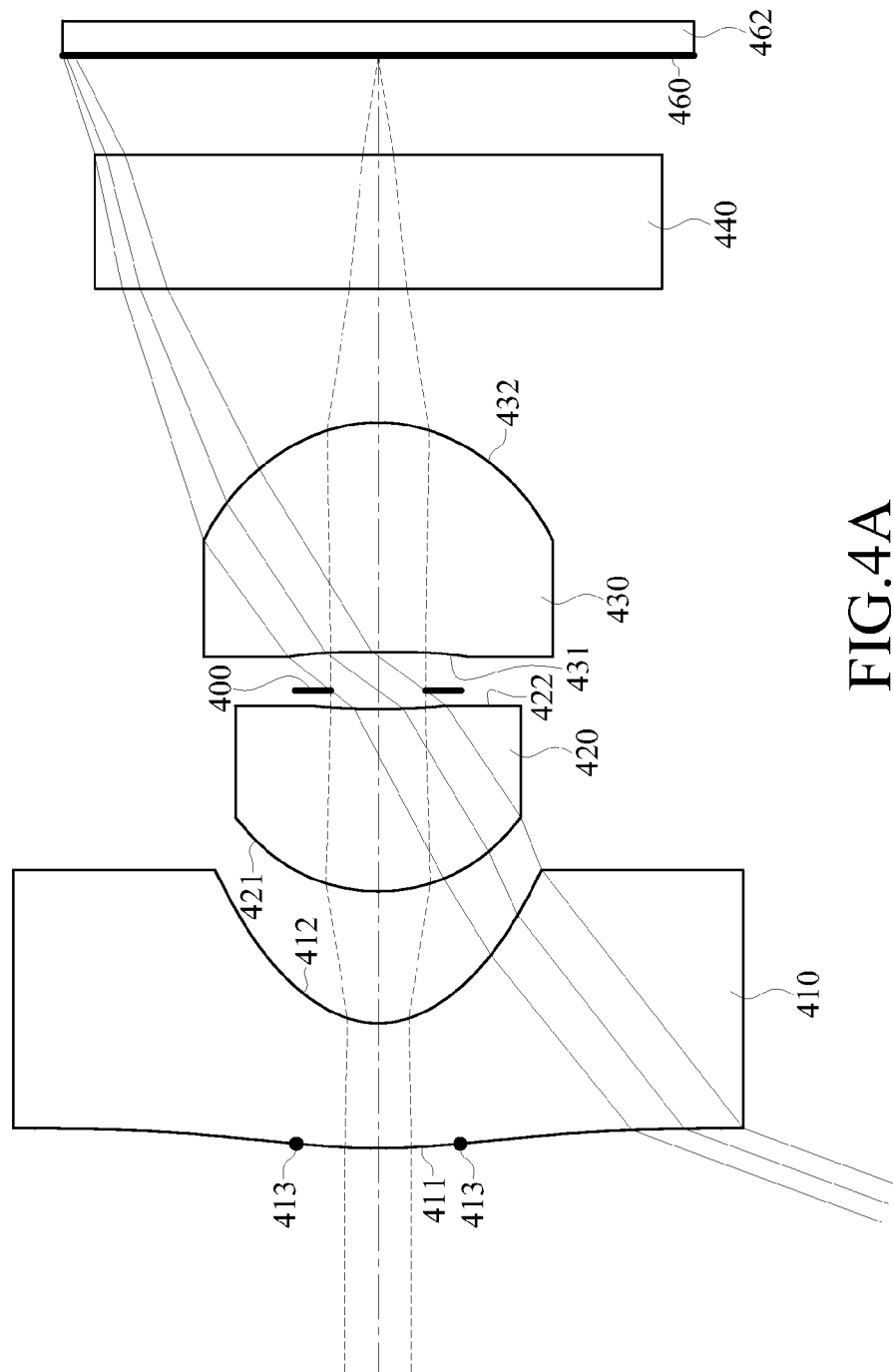
FIG. 4A is a schematic structural view of a fourth embodiment of the wide viewing angle optical lens assembly according to the present invention.

FIG. 4A is a schematic structural view of a forth embodiment of the wide viewing angle optical lens assembly according to the present invention. The specific implementation is substantially the same as that in the first embodiment, and the elements in the forth embodiment are the same as those in the first embodiment, so that the element symbols all begin with "4" as the hundredth digit, which represents that the elements have the same function or structure. For sake of conciseness, only the differences are illustrated below, and the similar parts will not be repeated herein.

In this embodiment, for example, the wavelength of the light received by the wide viewing angle optical lens assembly 40 is 587.6 nm, but the wavelength of the light received by the wide viewing angle optical lens assembly 40 may be adjusted according to actual requirements, and is not limited to the wavelength value mentioned above.

According to this embodiment of the present invention, a first lens element 410 has negative refractive power, a second lens element 420 has positive refractive power, and a third lens element 430 has positive refractive power. Wherein, an object-side surface 411 of the first lens element 410 is convex and there are two inflection points 413 on the object-side surface 411 of the first lens element 410, and an image-side surface 412 of the first lens element 410 is concave. An object-side surface 421 of the second lens element 420 is convex. An image-side surface 432 of the third lens element 430 is concave.

The detailed data of the wide viewing angle optical lens assembly 40 is as shown in Table 4-1 below.

TABLE 4-1

(Embodiment 4)
f = 0.48 mm, Fno = 3.25, HFOV = 69.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.309200 (ASP) | 0.280 | Plastic | 1.544 | 55.9 | −0.48 |
| 2 | | 0.202930 (ASP) | 0.296 | | | | |
| 3 | Lens 2 | 0.389600 (ASP) | 0.409 | Plastic | 1.634 | 23.8 | 0.70 |
| 4 | | 1.950550 (ASP) | 0.041 | | | | |
| 5 | Ape. Stop | Plano | 0.087 | | | | |
| 6 | Lens 3 | −4.753900 (ASP) | 0.514 | Plastic | 1.544 | 55.9 | 0.68 |
| 7 | | −0.357840 (ASP) | 0.300 | | | | |
| 8 | IR-filter | Plano | 0.300 | Glass | 1.517 | 64.2 | — |
| 9 | | Plano | 0.223 | | | | |
| 10 | Image | Plano | — | | | | |

Note:
Reference wavelength is d-line 587.6 nm

Furthermore, the first lens element 410, the second lens element 420, and the third lens element 430 are aspheric, and the aspheric surfaces may satisfy Formula ASP, but are not limited thereto. As for the parameters of the aspheric surfaces, reference is made to Table 4-2 below.

TABLE 4-2

Aspheric Coefficients

| Surface# | 1 | 2 | 3 | 4 | 6 | 7 |
|---|---|---|---|---|---|---|
| k | −5.64459E+01 | −2.06566E+00 | −3.44716E+00 | −1.00000E+00 | 9.90000E+01 | −8.56091E−01 |
| $A_4$ | −1.59819E−01 | 1.01202E+01 | 6.40921E+00 | 4.53199E+00 | −4.01893E+00 | 1.12115E−01 |
| $A_6$ | −6.12917E−02 | −4.37870E+01 | −7.62168E+00 | 9.17692E+01 | −6.78380E+01 | −9.89508E+00 |
| $A_8$ | 4.09541E−01 | 3.54388E+02 | 2.47696E+02 | −1.61235E+04 | 1.86686E+03 | 2.56988E+01 |
| $A_{10}$ | −2.65730E−01 | −1.33729E+03 | −1.73869E+03 | 4.19083E+05 | −1.23798E+04 | −2.61339E+02 |

The content of Table 4-3 may be deduced from Table 4-1.

TABLE 4-3

(Embodiment 4)

| f (mm) | 0.48 | $R_3/R_6$ | −1.09 |
|---|---|---|---|
| Fno | 3.25 | $(R_5 + R_6)/(R_5 − R_6)$ | 1.16 |
| HFOV(deg.) | 69.7 | $R_2/f$ | 0.42 |
| $R_1/|R_5|$ | 0.28 | $f_2/f_3$ | 1.03 |
| $R_3/R_4$ | 0.20 | SL/TTL | 0.56 |

FIG. 4B is a schematic view of longitudinal spherical aberration curves when the lights having a wavelength of 486.1 nm, 587.6 nm, and 656.3 nm are respectively projected in the wide viewing angle optical lens assembly 40 in FIG. 4A. It can be known from FIG. 4B that, no matter the wavelength of the light received by the wide viewing angle optical lens assembly 40 of this embodiment is 486.1 nm, 587.6 nm, or 656.3 nm, the longitudinal spherical aberration generated by the wide viewing angle optical lens assembly 40 is within the range of −0.04 mm to 0.03 mm.

FIG. 4C is a schematic view of astigmatic field curves when the light having the wavelength of 587.6 nm is projected in the wide viewing angle optical lens assembly 40 in FIG. 4A. It can be known from FIG. 4C that, the astigmatic field curvature of the tangential plane generated when the light having the wavelength of 587.6 nm is projected in the wide viewing angle optical lens assembly 40 is within the range of −0.0125 mm to 0.0125 mm, and the astigmatic field curvature of the sagittal plane is within the range of −0.01 mm to 0.0125 mm.

FIG. 4D is a schematic view of a distortion curve when the light having the wavelength of 587.6 nm is projected in the wide viewing angle optical lens assembly in FIG. 4A. It can be known from FIG. 4D that, the distortion ratio generated when the light having the wavelength of 587.6 nm is projected in the wide viewing angle optical lens assembly 40 is within the range of −50% to 0%. As shown in FIGS. 4B to 4D, the wide viewing angle optical lens assembly 40, designed according to the forth embodiment, is capable of greater angle of view.

The Fifth Embodiment

Embodiment 5

Figure 5A:
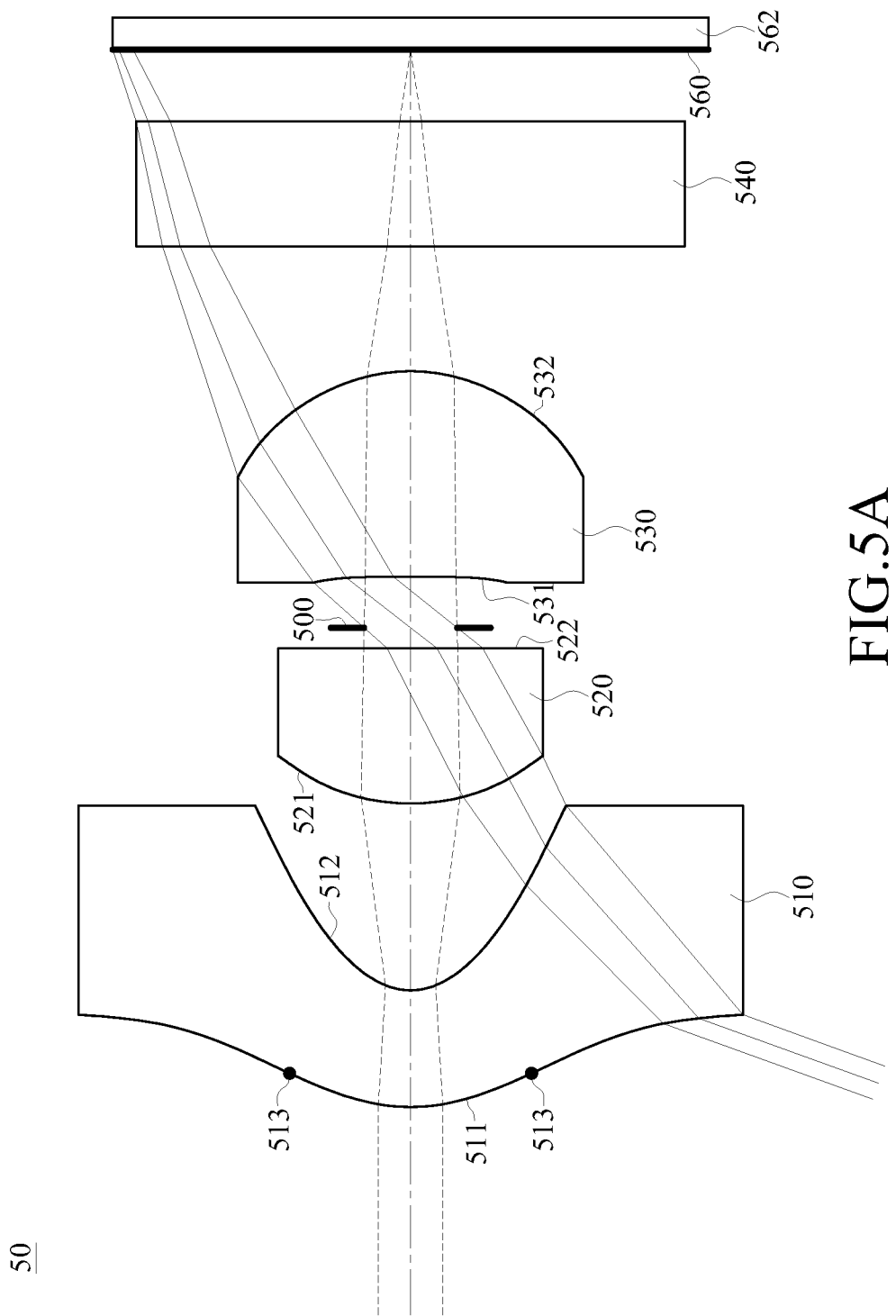
FIG. 5A is a schematic structural view of a fifth embodiment of the wide viewing angle optical lens assembly according to the present invention.

FIG. 5A is a schematic structural view of a fifth embodiment of the wide viewing angle optical lens assembly according to the present invention. The specific implementation is substantially the same as that in the first embodiment, and the elements in the fifth embodiment are the same as those in the first embodiment, so that the element symbols all begin with "5" as the hundredth digit, which represents that the elements have the same function or structure. For sake of conciseness, only the differences are illustrated below, and the similar parts will not be repeated herein.

In this embodiment, for example, the wavelength of the light received by the wide viewing angle optical lens assembly 50 is 587.6 nm, but the wavelength of the light received by the wide viewing angle optical lens assembly 50 may be adjusted according to actual requirements, and is not limited to the wavelength value mentioned above.

According to this embodiment of the present invention, a first lens element 510 has negative refractive power, a second lens element 520 has positive refractive power, and a third lens element 530 has positive refractive power. Wherein, an object-side surface 511 of the first lens element 510 is convex and there are two inflection points 513 on the object-side surface 511 of the first lens element 510. An image-side surface 512 of the first lens element 510 is concave. An object-side surface 521 of the second lens element 520 is convex. An image-side surface 532 of the third lens element 530 is concave.

The detailed data of the wide viewing angle optical lens assembly 50 is as shown in Table 5-1 below.

TABLE 5-1

(Embodiment 5)
f = 0.51 mm, Fno = 3.30, HFOV = 70.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.442780 (ASP) | 0.280 | Plastic | 1.544 | 55.9 | −0.62 |
| 2 | | 0.148260 (ASP) | 0.449 | | | | |
| 3 | Lens 2 | 0.515300 (ASP) | 0.373 | Plastic | 1.634 | 23.8 | 0.81 |
| 4 | | −40.115000 (ASP) | 0.049 | | | | |
| 5 | Ape. Stop | Plano | 0.122 | | | | |
| 6 | Lens 3 | −50.000000 (ASP) | 0.494 | Plastic | 1.544 | 55.9 | 0.78 |
| 7 | | −0.420720 (ASP) | 0.300 | | | | |
| 8 | IR-filter | Plano | 0.300 | Glass | 1.517 | 64.2 | — |
| 9 | | Plano | 0.173 | | | | |
| 10 | Image | Plano | — | | | | |

Note:
Reference wavelength is d-line 587.6 nm

Furthermore, the first lens element 510, the second lens element 520, and the third lens element 530 are aspheric, and the aspheric surfaces may satisfy formula ASP, but are not limited thereto. As for the parameters of the aspheric surfaces, reference is made to Table 5-2 below.

TABLE 5-2

Aspheric Coefficients

| Surface# | 1 | 2 | 3 | 4 | 6 | 7 |
|---|---|---|---|---|---|---|
| k | −1.41024E+00 | −1.50163E+00 | −9.54979E+00 | −1.00000E+00 | 9.90000E+01 | −2.54931E+00 |
| $A_4$ | −1.57529E+00 | 1.40916E+01 | 8.34722E+00 | 3.29779E−01 | −9.96605E−01 | −2.22242E+00 |
| $A_6$ | 9.92867E−01 | −6.96891E+01 | −5.38168E+01 | 2.18309E+02 | −1.56690E+02 | −6.80196E−01 |
| $A_8$ | 6.80645E−01 | 2.10689E+02 | 4.41253E+02 | −1.56337E+04 | 2.64644E+03 | −4.43597E+00 |
| $A_{10}$ | −7.33326E−01 | −5.57106E+02 | −2.36969E+03 | 2.82042E+05 | −1.76169E+04 | −1.54876E+02 |

The content of Table 5-3 may be deduced from Table 5-1.

TABLE 5-3

(Embodiment 5)

| f (mm) | 0.51 | $R_3/R_6$ | −1.22 |
|---|---|---|---|
| Fno | 3.30 | $(R_5 + R_6)/(R_5 − R_6)$ | 1.02 |
| HFOV(deg.) | 70.1 | $R_2/f$ | 0.29 |
| $R_1/|R_5|$ | 0.01 | $f_2/f_3$ | 1.04 |
| $R_3/R_4$ | −0.01 | SL/TTL | 0.53 |

FIG. 5B is a schematic view of longitudinal spherical aberration curves when the lights having a wavelength of 486.1 nm, 587.6 nm, and 656.3 nm are respectively projected in the wide viewing angle optical lens assembly 50 in FIG. 5A. It can be known from FIG. 5B that, no matter the wavelength of the light received by the wide viewing angle optical lens assembly 50 of this embodiment is 486.1 nm, 587.6 nm, or 656.3 nm, the longitudinal spherical aberration generated by the wide viewing angle optical lens assembly 50 is within the range of −0.04 mm to 0.015 mm.

FIG. 5C is a schematic view of astigmatic field curves when the light having the wavelength of 587.6 nm is projected in the wide viewing angle optical lens assembly 50 in FIG. 5A. It can be known from FIG. 5C that, the astigmatic field curvature of the tangential plane generated when the light having the wavelength of 587.6 nm is projected in the wide viewing angle optical lens assembly 50 is within the range of −0.035 mm to 0.02 mm, and the astigmatic field curvature of the sagittal plane is within the range of −0.02 mm to 0.006 mm.

FIG. 5D is a schematic view of a distortion curve when the light having the wavelength of 587.6 nm is projected in the wide viewing angle optical lens assembly in FIG. 5A. It can be known from FIG. 5D that, the distortion ratio generated when the light having the wavelength of 587.6 nm is projected in the wide viewing angle optical lens assembly 50 is within the range of −50% to 0%. As shown in FIGS. 5B to 5D, the wide viewing angle optical lens assembly 50, designed according to the fifth embodiment, is capable of greater angle of view.

The Sixth Embodiment

Embodiment 6

Figure 6A:
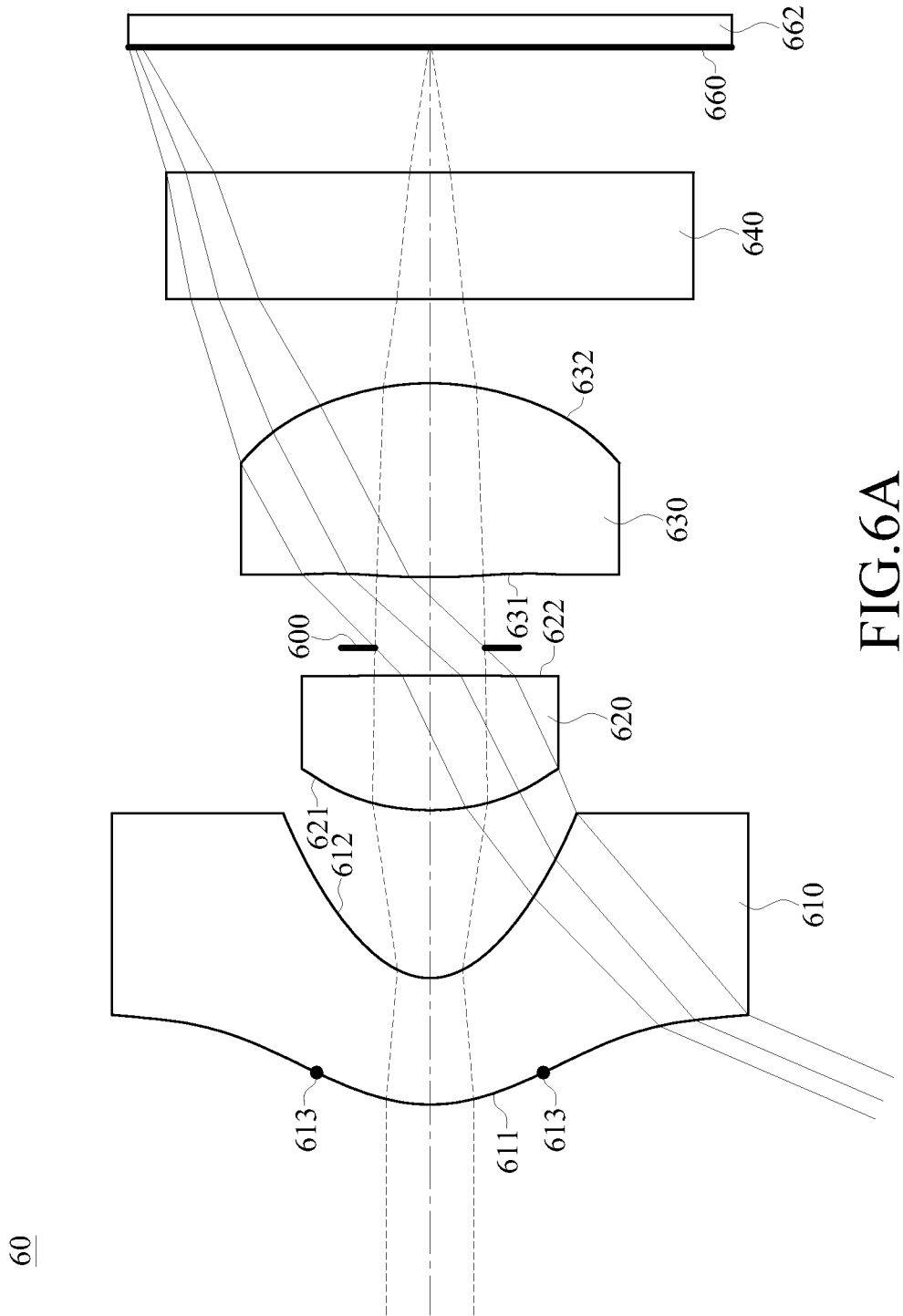
FIG. 6A is a schematic structural view of a sixth embodiment of the wide viewing angle optical lens assembly according to the present invention.

FIG. 6A is a schematic structural view of a sixth embodiment of the wide viewing angle optical lens assembly according to the present invention. The specific implementation is substantially the same as that in the first embodiment, and the elements in the sixth embodiment are the same as those in the first embodiment, so that the element symbols all begin with "6" as the hundredth digit, which represents that the elements have the same function or structure. For sake of conciseness, only the differences are illustrated below, and the similar parts will not be repeated herein.

In this embodiment, for example, the wavelength of the light received by the wide viewing angle optical lens assembly 60 is 587.6 nm, but the wavelength of the light received by the wide viewing angle optical lens assembly 60 may be adjusted according to actual requirements, and is not limited to the wavelength value mentioned above.

According to this embodiment of the present invention, a first lens element 610 has negative refractive power, a second lens element 620 has positive refractive power, and a third lens element 630 has positive refractive power. Wherein, an object-side surface 611 of the first lens element 610 is convex and there are two inflection points 613 on the object-side surface 611 of the first lens element 610. An image-side surface 612 of the first lens element 610 is concave. An object-side surface 621 of the second lens element 620 is convex. An image-side surface 632 of the third lens element 630 is concave.

The detailed data of the wide viewing angle optical lens assembly 60 is as shown in Table 6-1 below.

TABLE 6-1

(Embodiment 6)
f = 0.68 mm, Fno = 3.30, HFOV = 66.72 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.406780 (ASP) | 0.280 | Plastic | 1.544 | 55.9 | −0.75 |
| 2 | | 0.150930 (ASP) | 0.449 | | | | |
| 3 | Lens 2 | 0.556410 (ASP) | 0.373 | Plastic | 1.634 | 23.8 | 0.83 |
| 4 | | −7.486500 (ASP) | 0.049 | | | | |
| 5 | Ape. Stop | Plano | 0.122 | | | | |
| 6 | Lens 3 | 1.823590 (ASP) | 0.494 | Plastic | 1.544 | 55.9 | 0.92 |
| 7 | | −0.628050 (ASP) | 0.300 | | | | |
| 8 | IR-filter | Plano | 0.300 | Glass | 1.517 | 64.2 | — |
| 9 | | Plano | 0.298 | | | | |
| 10 | Image | Plano | — | | | | |

Note:
Reference wavelength is d-line 587.6 nm

Furthermore, the first lens element 610, the second lens element 620, and the third lens element 630 are aspheric, and the aspheric surfaces may satisfy Formula ASP, but are not limited thereto. As for the parameters of the aspheric surfaces, reference is made to Table 6-2 below.

TABLE 6-2

Aspheric Coefficients

| Surface# | 1 | 2 | 3 | 4 | 6 | 7 |
|---|---|---|---|---|---|---|
| k | −1.26559E+00 | −1.45066E+00 | −3.88575E+00 | 9.81500E+01 | −9.90000E+01 | −1.89159E+00 |
| $A_4$ | −2.09406E+00 | 1.15746E+01 | 3.89361E+00 | −2.93580E−01 | 1.85490E+00 | −1.87278E−02 |
| $A_6$ | 1.23396E+00 | −6.34076E+01 | −2.82761E+01 | 2.48108E+02 | −9.47990E+01 | 8.77108E−01 |
| $A_8$ | 1.67738E+00 | 2.56932E+02 | 8.30009E+02 | −9.45893E+03 | 9.73934E+02 | −6.57468E+01 |
| $A_{10}$ | −1.66270E+00 | −1.18395E+02 | −6.42952E+03 | 9.50080E+04 | −3.43057E+03 | 1.71784E+02 |

The content of Table 6-3 may be deduced from Table 6-1.

TABLE 6-3

(Embodiment 6)

| f (mm) | 0.68 | $R_3/R_6$ | −0.89 |
|---|---|---|---|
| Fno | 3.30 | $(R_5 + R_6)/(R_5 − R_6)$ | 0.49 |
| HFOV(deg.) | 66.7 | $R_2/f$ | 0.22 |

TABLE 6-3-continued (Embodiment 6)

| $R_1/|R_5|$ | 0.22 | $f_2/f_3$ | 0.90 |
|---|---|---|---|
| $R_3/R_4$ | −0.07 | SL/TTL | 0.55 |

FIG. 6B is a schematic view of longitudinal spherical aberration curves when the lights having a wavelength of 486.1 nm, 587.6 nm, and 656.3 nm are respectively projected in the wide viewing angle optical lens assembly 60 in FIG. 6A. It can be known from FIG. 6B that, no matter the wavelength of the light received by the wide viewing angle optical lens assembly 60 of this embodiment is 486.1 nm, 587.6 nm, or 656.3 nm, the longitudinal spherical aberration generated by the wide viewing angle optical lens assembly 60 is within the range of −0.04 mm to 0.035 mm.

FIG. 6C is a schematic view of astigmatic field curves when the light having the wavelength of 587.6 nm is projected in the wide viewing angle optical lens assembly 60 in FIG. 6A. It can be known from FIG. 6C that, the astigmatic field curvature of the tangential plane generated when the light having the wavelength of 587.6 nm is projected in the wide viewing angle optical lens assembly 60 is within the range of 0.0 mm to 0.025 mm, and the astigmatic field curvature of the sagittal plane is within the range of 0.0 mm to 0.025 mm.

FIG. 6D is a schematic view of a distortion curve when the light having the wavelength of 587.6 nm is projected in the wide viewing angle optical lens assembly in FIG. 6A. It can be known from FIG. 6D that, the distortion ratio generated when the light having the wavelength of 587.6 nm is projected in the wide viewing angle optical lens assembly 60 is within the range of −50% to 0%. As shown in FIGS. 6B to 6D, the wide viewing angle optical lens assembly 60, designed according to the sixth embodiment, is capable of greater angle of view.

The Seventh Embodiment

Embodiment 7

Figure 7A:
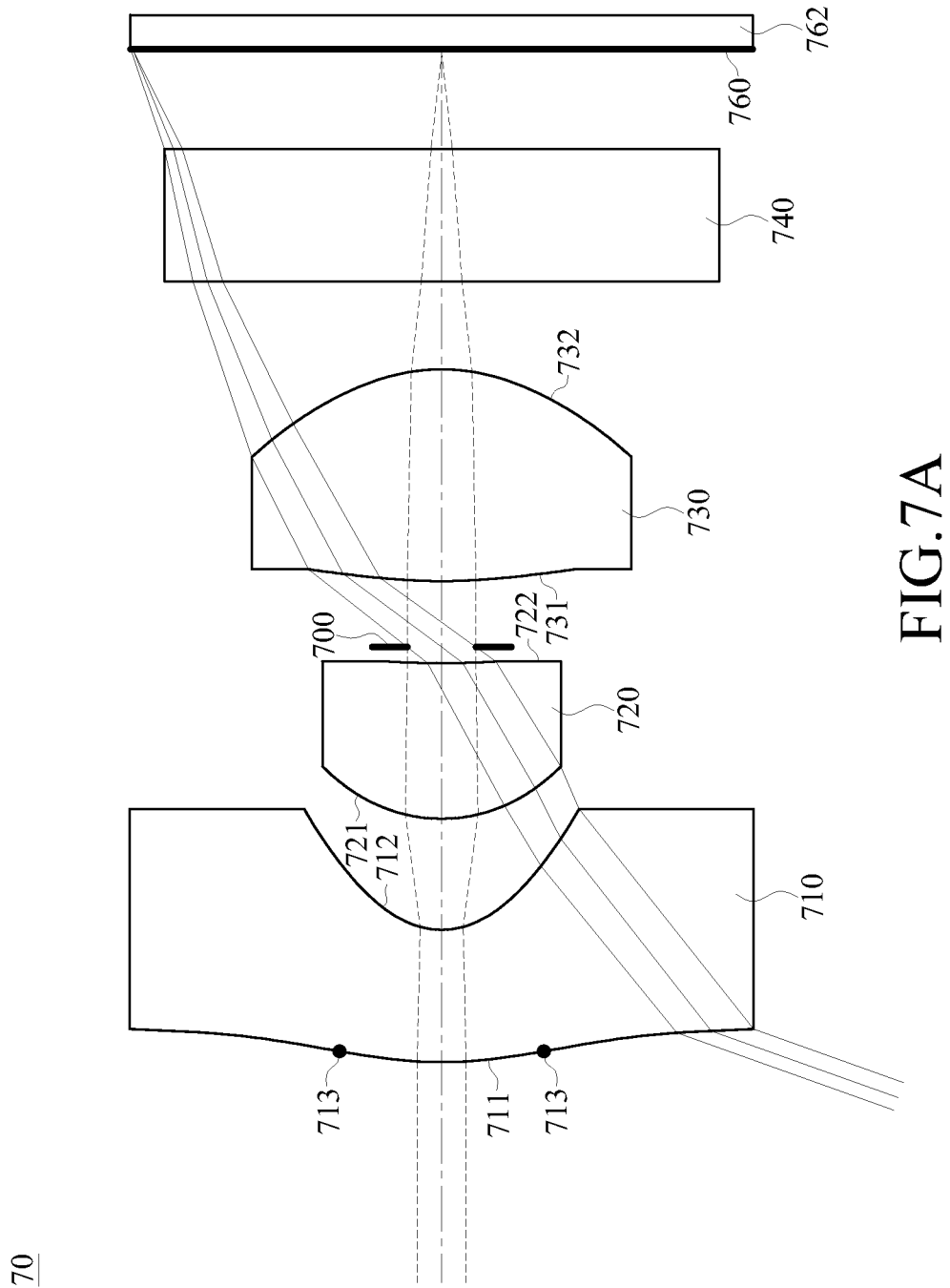
FIG. 7A is a schematic structural view of a seventh embodiment of the wide viewing angle optical lens assembly according to the present invention.

FIG. 7A is a schematic structural view of a seventh embodiment of the wide viewing angle optical lens assembly according to the present invention. The specific implementation is substantially the same as that in the first embodiment, and the elements in the seventh embodiment are the same as those in the first embodiment, so that the element symbols all begin with "7" as the hundredth digit, which represents that the elements have the same function or structure. For sake of conciseness, only the differences are illustrated below, and the similar parts will not be repeated herein.

In this embodiment, for example, the wavelength of the light received by the wide viewing angle optical lens assembly 70 is 587.6 nm, but the wavelength of the light received by the wide viewing angle optical lens assembly 70 may be adjusted according to actual requirements, and is not limited to the wavelength value mentioned above.

According to this embodiment of the present invention, a first lens element 710 has negative refractive power, a second lens element 720 has positive refractive power, and a third lens element 730 has positive refractive power. Wherein, an object-side surface 711 of the first lens element 710 is convex and there are two inflection points 713 on the object-side surface 711 of the first lens element 710. An image-side surface 712 of the first lens element 710 is concave. An object-side surface 721 of the second lens element 720 is convex. An image-side surface 732 of the third lens element 730 is concave.

The detailed data of the wide viewing angle optical lens assembly 70 is as shown in Table 7-1 below.

TABLE 7-1

(Embodiment 7)
f = 0.51 mm, Fno = 4.60, HFOV = 70.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.902910 (ASP) | 0.300 | Glass | 1.592 | 60.6 | −0.44 |
| 2 | | 0.176410 (ASP) | 0.252 | | | | |
| 3 | Lens 2 | 0.360100 (ASP) | 0.353 | Plastic | 1.634 | 23.8 | 0.63 |
| 4 | | 2.369680 (ASP) | 0.036 | | | | |
| 5 | Ape. Stop | Plano | 0.150 | | | | |
| 6 | Lens 3 | 1.343410 (ASP) | 0.480 | Plastic | 1.514 | 56.8 | 0.70 |
| 7 | | −0.430010 (ASP) | 0.200 | | | | |
| 8 | IR-filter | Plano | 0.300 | Glass | 1.517 | 64.2 | — |
| 9 | | Plano | 0.227 | | | | |
| 10 | Image | Plano | — | | | | |

Note:
Reference wavelength is d-line 587.6 nm

Furthermore, the first lens element 710, the second lens element 720, and the third lens element 730 are aspheric, and the aspheric surfaces may satisfy Formula ASP, but are not limited thereto. As for the parameters of the aspheric surfaces, reference is made to Table 7-2 below.

TABLE 7-2

| | Aspheric Coefficients | | | | | |
|---|---|---|---|---|---|---|
| Surface# | 1 | 2 | 3 | 4 | 6 | 7 |
| k | −9.45206E+00 | −1.28545E+00 | −1.25880E+00 | 2.18526E+01 | 2.99134E−02 | −4.67339E+00 |
| $A_4$ | −7.02230E−01 | 8.08617E+00 | 5.17142E+00 | 3.09484E−01 | −6.14536E−01 | −4.76195E+00 |
| $A_6$ | 7.71590E−01 | −3.14909E+01 | −4.68939E+01 | 2.72861E+02 | −1.55264E+01 | 3.96035E+01 |
| $A_8$ | 1.13029E−01 | −4.40284E+02 | 6.54191E+02 | −1.83352E+04 | 1.92275E+02 | −1.99969E+02 |
| $A_{10}$ | −3.81998E−01 | 4.00765E+03 | −3.46080E+03 | 3.30927E+05 | −6.60085E+02 | 3.85623E+02 |

The content of Table 7-3 may be deduced from Table 7-1.

TABLE 7-3

(Embodiment 7)

| | | | |
|---|---|---|---|
| f (mm) | 0.51 | $R_3/R_6$ | −0.84 |
| Fno | 4.60 | $(R_5 + R_6)/(R_5 − R_6)$ | 0.52 |
| HFOV(deg.) | 70.4 | $R_2/f$ | 0.35 |
| $R_1/|R_5|$ | 0.67 | $f_2/f_3$ | 0.90 |
| $R_3/R_4$ | 0.15 | SL/TTL | 0.57 |

FIG. 7B is a schematic view of longitudinal spherical aberration curves when the lights having a wavelength of 486.1 nm, 587.6 nm, and 656.3 nm are respectively projected in the wide viewing angle optical lens assembly 70 in FIG. 7A. It can be known from FIG. 7B that, no matter the wavelength of the light received by the wide viewing angle optical lens assembly 70 of this embodiment is 486.1 nm, 587.6 nm, or 656.3 nm, the longitudinal spherical aberration generated by the wide viewing angle optical lens assembly 70 is within the range of −0.06 mm to 0.015 mm.

FIG. 7C is a schematic view of astigmatic field curves when the light having the wavelength of 587.6 nm is projected in the wide viewing angle optical lens assembly 70 in FIG. 7A. It can be known from FIG. 7C that, the astigmatic field curvature of the tangential plane generated when the light having the wavelength of 587.6 nm is projected in the wide viewing angle optical lens assembly 70 is within the range of −0.025 mm to 0.015 mm, and the astigmatic field curvature of the sagittal plane is within the range of −0.015 mm to 0.010 mm.

FIG. 7D is a schematic view of a distortion curve when the light having the wavelength of 587.6 nm is projected in the wide viewing angle optical lens assembly in FIG. 7A. It can be known from FIG. 7D that, the distortion ratio generated when the light having the wavelength of 587.6 nm is projected in the wide viewing angle optical lens assembly 70 is within the range of −60% to 0%. As shown in FIGS. 7B to 7D, the wide viewing angle optical lens assembly 70, designed according to the seventh embodiment, is capable of greater angle of view.

The Eighth Embodiment

Embodiment 8

Figure 8A:
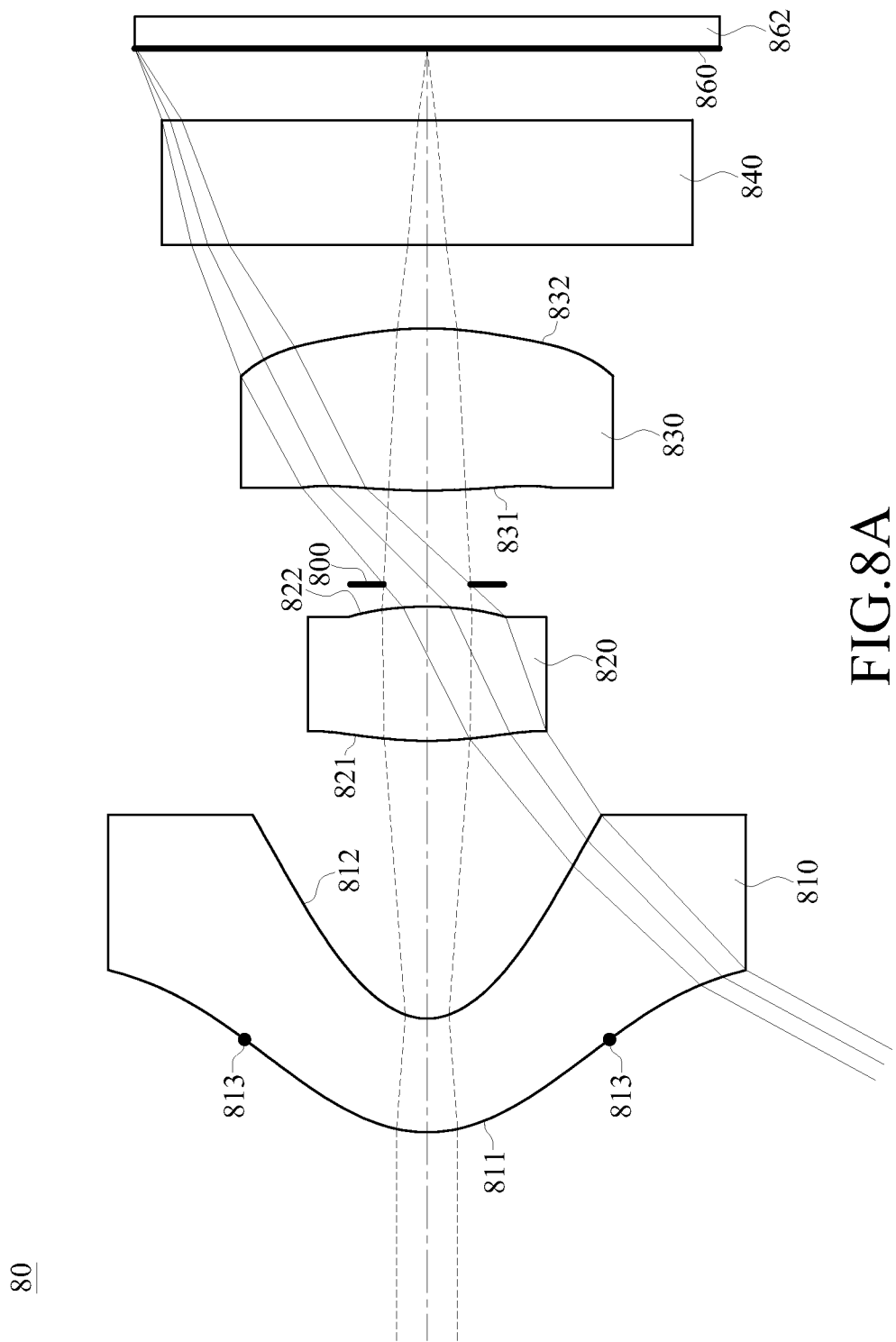
FIG. 8A is a schematic structural view of an eighth embodiment of the wide viewing angle optical lens assembly according to the present invention.

FIG. 8A is a schematic structural view of an eighth embodiment of the wide viewing angle optical lens assembly according to the present invention. The specific implementation is substantially the same as that in the first embodiment, and the elements in the eighth embodiment are the same as those in the first embodiment, so that the element symbols all begin with "8" as the hundredth digit, which represents that the elements have the same function or structure. For sake of conciseness, only the differences are illustrated below, and the similar parts will not be repeated herein.

In this embodiment, for example, the wavelength of the light received by the wide viewing angle optical lens assembly 80 is 587.6 nm, but the wavelength of the light received by the wide viewing angle optical lens assembly 80 may be adjusted according to actual requirements, and is not limited to the wavelength value mentioned above.

According to this embodiment of the present invention, a first lens element 810 has negative refractive power, a second lens element 820 has positive refractive power, and a third lens element 830 has positive refractive power. Wherein, an object-side surface 811 of the first lens element 810 is convex and there are two inflection points 813 on the object-side surface 811 of the first lens element 810. An image-side surface 812 of the first lens element 810 is concave. An object-side surface 821 of the second lens element 820 is convex. An image-side surface 832 of the third lens element 830 is concave.

The detailed data of the wide viewing angle optical lens assembly 80 is as shown in Table 8-1 below.

TABLE 8-1

(Embodiment 8)
f = 0.58 mm, Fno = 4.00, HFOV = 61.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.329250 (ASP) | 0.273 | Plastic | 1.530 | 55.8 | −0.97 |
| 2 | | 0.142860 (ASP) | 0.667 | | | | |
| 3 | Lens 2 | 0.973330 (ASP) | 0.322 | Plastic | 1.530 | 55.8 | 0.88 |
| 4 | | −0.792900 (ASP) | 0.053 | | | | |
| 5 | Ape. Stop | Plano | 0.226 | | | | |
| 6 | Lens 3 | 2.000290 (ASP) | 0.389 | Plastic | 1.530 | 55.8 | 1.12 |
| 7 | | −0.786220 (ASP) | 0.200 | | | | |
| 8 | IR-filter | Plano | 0.300 | Glass | 1.517 | 64.2 | — |
| 9 | | Plano | 0.171 | | | | |
| 10 | Image | Plano | — | | | | |

Note:
Reference wavelength is d-line 587.6 nm

Furthermore, the first lens element 810, the second lens element 820, and the third lens element 830 are aspheric, and the aspheric surfaces may satisfy Formula ASP, but are not limited thereto. As for the parameters of the aspheric surfaces, reference is made to Table 8-2 below.

TABLE 8-2

| Surface# | Aspheric Coefficients | | | | | |
|---|---|---|---|---|---|---|
|  | 1 | 2 | 3 | 4 | 6 | 7 |
| k | −1.04484E+00 | −1.54285E+00 | −1.00000E+01 | −1.00000E+00 | −1.00000E+00 | 1.21000E+00 |
| $A_4$ | −1.84854E+00 | 1.30316E+01 | 4.16902E−02 | −1.81157E+00 | 1.85088E+00 | 4.32511E+00 |
| $A_6$ | 6.86325E−01 | −7.96331E+01 | −3.88644E+01 | −4.64127E+00 | −8.32064E+01 | −1.83293E+01 |
| $A_8$ | 5.85845E−01 | 1.91055E+02 | 3.60560E+02 | −9.09302E+00 | 6.36782E+02 | −3.50790E+00 |
| $A_{10}$ | −3.52518E−01 | −1.55943E+02 | −2.27978E+03 | 1.82602E+02 | −2.02288E+03 | 9.00853E+01 |

The content of Table 8-3 may be deduced from Table 8-1.

TABLE 8-3

(Embodiment 8)

| f (mm) | 0.58 | $R_3/R_6$ | −1.24 |
|---|---|---|---|
| Fno | 4.00 | $(R_5 + R_6)/(R_5 − R_6)$ | 0.42 |
| HFOV(deg.) | 61.4 | $R_2/f$ | 0.25 |
| $R_1/|R_5|$ | 0.16 | $f_2/f_3$ | 0.79 |
| $R_3/R_4$ | −1.23 | SL/TTL | 0.47 |

Figures 8B, 8C, 8D:
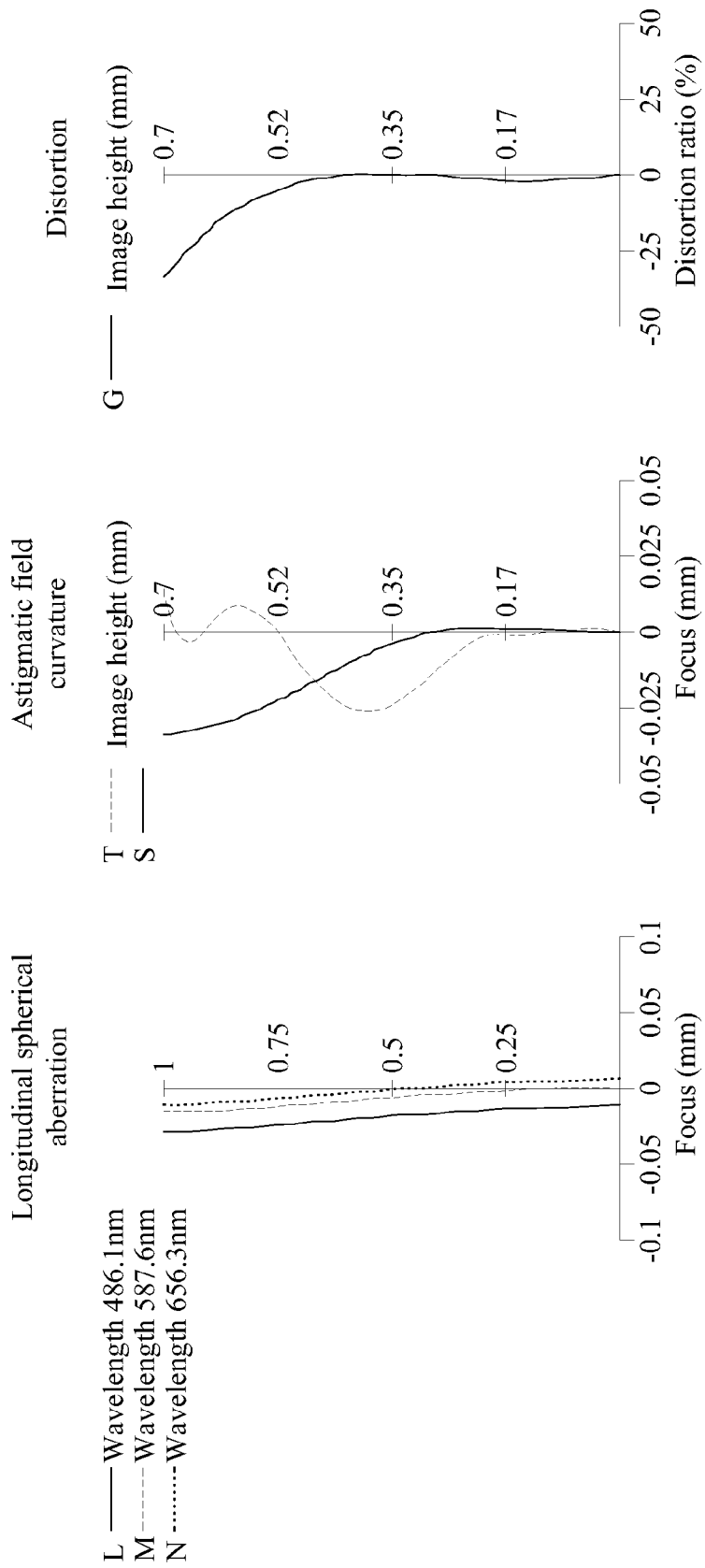
FIG. 8B is a schematic view of longitudinal spherical aberration curves when the lights having wavelengths of 486.1 nm, 587.6 nm, and 656.3 nm are respectively projected in the wide viewing angle optical lens assembly in FIG. 8A.
FIG. 8C is a schematic view of astigmatic field curves when the light having the wavelength of 587.6 nm is projected in the wide viewing angle optical lens assembly in FIG. 8A.
FIG. 8D is a schematic view of a distortion curve when the light having the wavelength of 587.6 nm is projected in the wide viewing angle optical lens assembly in FIG. 8A.

FIG. 8B is a schematic view of longitudinal spherical aberration curves when the lights having a wavelength of 486.1 nm, 587.6 nm, and 656.3 nm are respectively projected in the wide viewing angle optical lens assembly 80 in FIG. 8A. It can be known from FIG. 8B that, no matter the wavelength of the light received by the wide viewing angle optical lens assembly 80 of this embodiment is 486.1 nm, 587.6 nm, or 656.3 nm, the longitudinal spherical aberration generated by the wide viewing angle optical lens assembly 80 is within the range of −0.04 mm to 0.01 mm.

FIG. 8C is a schematic view of astigmatic field curves when the light having the wavelength of 587.6 nm is projected in the wide viewing angle optical lens assembly 80 in FIG. 8A. It can be known from FIG. 8C that, the astigmatic field curvature of the tangential plane generated when the light having the wavelength of 587.6 nm is projected in the wide viewing angle optical lens assembly 80 is within the range of −0.030 mm to 0.015 mm, and the astigmatic field curvature of the sagittal plane is within the range of −0.040 mm to 0.005 mm.

FIG. 8D is a schematic view of a distortion curve when the light having the wavelength of 587.6 nm is projected in the wide viewing angle optical lens assembly in FIG. 8A. It can be known from FIG. 8D that, the distortion ratio generated when the light having the wavelength of 587.6 nm is projected in the wide viewing angle optical lens assembly 30 is within the range of −40% to 0%. As shown in FIGS. 8B to 8D, the wide viewing angle optical lens assembly 80, designed according to the eighth embodiment, is capable of greater angle of view.

The Ninth Embodiment

Embodiment 9

Figure 9A:
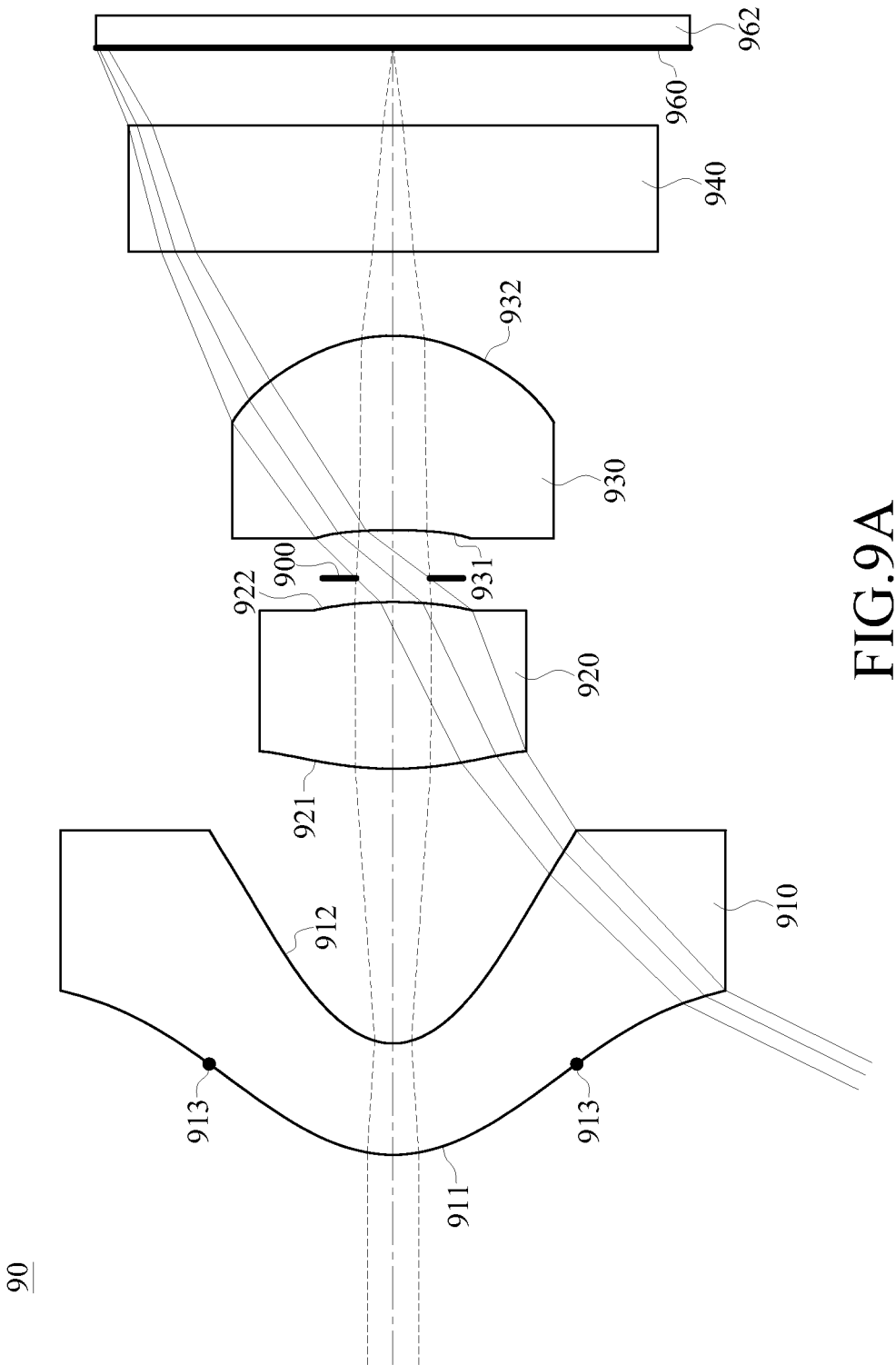
FIG. 9A is a schematic structural view of an ninth embodiment of the wide viewing angle optical lens assembly according to the present invention.

FIG. 9A is a schematic structural view of a ninth embodiment of the wide viewing angle optical lens assembly according to the present invention. The specific implementation is substantially the same as that in the first embodiment, and the elements in the ninth embodiment are the same as those in the first embodiment, so that the element symbols all begin with "9" as the hundredth digit, which represents that the elements have the same function or structure. For sake of conciseness, only the differences are illustrated below, and the similar parts will not be repeated herein.

In this embodiment, for example, the wavelength of the light received by the wide viewing angle optical lens assembly 90 is 587.6 nm, but the wavelength of the light received by the wide viewing angle optical lens assembly 90 may be adjusted according to actual requirements, and is not limited to the wavelength value mentioned above.

According to this embodiment of the present invention, a first lens element 910 has negative refractive power, a second lens element 920 has positive refractive power, and a third lens element 930 has positive refractive power. Wherein, an object-side surface 911 of the first lens element 910 is convex and there are two inflection points 913 on the object-side surface 911 of the first lens element 910. An image-side surface 912 of the first lens element 910 is concave. An object-side surface 921 of the second lens element 920 is convex. An image-side surface 932 of the third lens element 930 is concave.

The detailed data of the wide viewing angle optical lens assembly 90 is as shown in Table 9-1 below.

TABLE 9-1

(Embodiment 9)
f = 0.49 mm, Fno = 4.00, HFOV = 63.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 0.341590 (ASP) | 0.265 | Plastic | 1.583 | 30.2 | −0.87 |
| 2 | | 0.146090 (ASP) | 0.654 | | | | |
| 3 | Lens 2 | 0.853560 (ASP) | 0.397 | Plastic | 1.634 | 23.8 | 0.79 |
| 4 | | −0.980350 (ASP) | 0.056 | | | | |
| 5 | Ape. Stop | Plano | 0.115 | | | | |
| 6 | Lens 3 | −1.472900 (ASP) | 0.463 | Plastic | 1.544 | 55.9 | 0.87 |
| 7 | | −0.398480 (ASP) | 0.200 | | | | |
| 8 | IR-filter | Plano | 0.300 | Glass | 1.517 | 64.2 | — |
| 9 | | Plano | 0.185 | | | | |
| 10 | Image | Plano | — | | | | |

Note:
Reference wavelength is d-line 587.6 nm

Furthermore, the first lens element 910, the second lens element 920, and the third lens element 930 are aspheric, and the aspheric surfaces may satisfy Formula ASP, but are not limited thereto. As for the parameters of the aspheric surfaces, reference is made to Table 9-2 below. viewing angle optical lens assembly 90 is within the range of −0.03 mm to 0.03 mm, and the astigmatic field curvature of the sagittal plane is within the range of −0.04 mm to 0.01 mm.

FIG. 9D is a schematic view of a distortion curve when the light having the wavelength of 587.6 nm is projected in the

TABLE 9-2

Aspheric Coefficients

| Surface# | 1 | 2 | 3 | 4 | 6 | 7 |
|---|---|---|---|---|---|---|
| k | −1.01406E+00 | −1.55442E+00 | −1.55535E+00 | −1.00000E+00 | −1.00000E+00 | −7.68295E−01 |
| $A_4$ | −1.83394E+00 | 1.43979E+01 | −1.01493E−01 | −1.38393E+00 | −6.68776E+00 | −2.49916E−01 |
| $A_6$ | 6.30877E−01 | −8.46920E+01 | −3.36028E+01 | −3.73923E+00 | 2.10508E+02 | 2.02411E+01 |
| $A_8$ | 5.64590E−01 | 9.95818E+01 | 3.64894E+02 | 2.69847E+01 | −1.03003E+04 | −1.65420E+02 |
| $A_{10}$ | −3.25075E−01 | 2.37775E+02 | −1.76215E+03 | −5.89204E+01 | 1.11129E+05 | 8.90514E+01 |

The content of Table 9-3 may be deduced from Table 9-1.

TABLE 9-3

(Embodiment 9)

| f (mm) | 0.49 | $R_3/R_6$ | −2.14 |
|---|---|---|---|
| Fno | 4.00 | $(R_5 + R_6)/(R_5 − R_6)$ | 1.74 |
| HFOV(deg.) | 63.7 | $R_2/f$ | 0.30 |
| $R_1/|R_5|$ | 0.23 | $f_2/f_3$ | 0.91 |
| $R_3/R_4$ | −0.87 | SL/TTL | 0.46 |

FIG. 9B is a schematic view of longitudinal spherical aberration curves when the lights having a wavelength of 486.1 nm, 587.6 nm, and 656.3 nm are respectively projected in the wide viewing angle optical lens assembly 90 in FIG. 9A. It can be known from FIG. 9B that, no matter the wavelength of the light received by the wide viewing angle optical lens assembly 90 of this embodiment is 486.1 nm, 587.6 nm, or 656.3 nm, the longitudinal spherical aberration generated by the wide viewing angle optical lens assembly 90 is within the range of −0.04 mm to 0.01 mm.

FIG. 9C is a schematic view of astigmatic field curves when the light having the wavelength of 587.6 nm is projected in the wide viewing angle optical lens assembly 90 in FIG. 9A. It can be known from FIG. 9C that, the astigmatic field curvature of the tangential plane generated when the light having the wavelength of 587.6 nm is projected in the wide wide viewing angle optical lens assembly in FIG. 9A. It can be known from FIG. 9D that, the distortion ratio generated when the light having the wavelength of 587.6 nm is projected in the wide viewing angle optical lens assembly 90 is within the range of −30% to 0%. As shown in FIGS. 9B to 9D, the wide viewing angle optical lens assembly 90, designed according to the ninth embodiment, is capable of greater angle of view.

The Tenth Embodiment

Embodiment 10

Figure 10A:
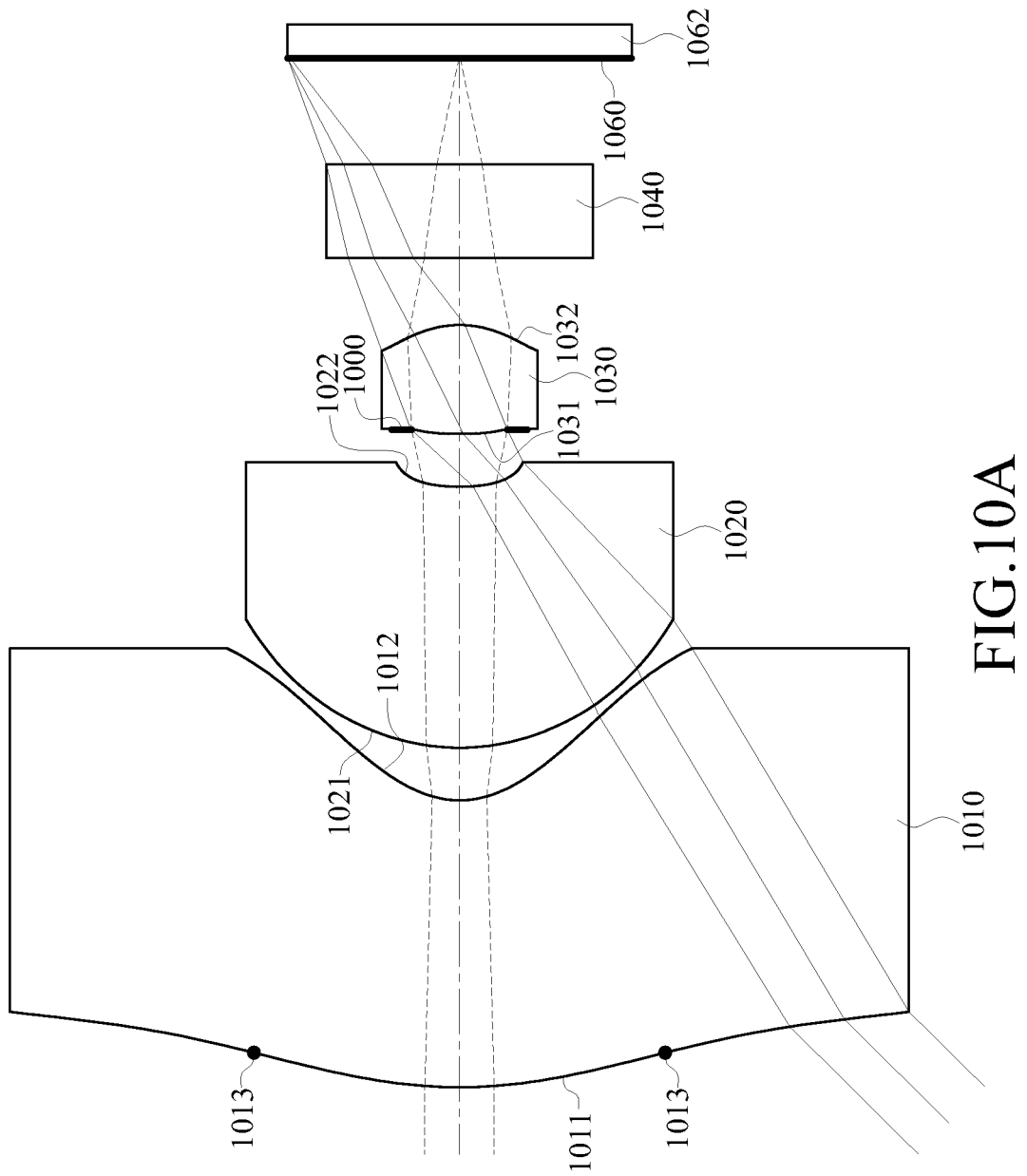
FIG. 10A is a schematic structural view of an tenth embodiment of the wide viewing angle optical lens assembly according to the present invention.

FIG. 10A is a schematic structural view of a tenth embodiment of the wide viewing angle optical lens assembly according to the present invention. The specific implementation is substantially the same as that in the first embodiment, and the elements in the tenth embodiment are the same as those in the first embodiment, so that the element symbols all begin with "10" as the hundredth digit, which represents that the elements have the same function or structure. For sake of conciseness, only the differences are illustrated below, and the similar parts will not be repeated herein.

In this embodiment, for example, the wavelength of the light received by the wide viewing angle optical lens assembly 100 is 587.6 nm, but the wavelength of the light received by the wide viewing angle optical lens assembly 100 may be adjusted according to actual requirements, and is not limited to the wavelength value mentioned above.

According to this embodiment of the present invention, a first lens element 1010 has negative refractive power, a second lens element 1020 has positive refractive power, and a third lens element 1030 has positive refractive power. Wherein, an object-side surface 1011 of the first lens element 1010 is convex and there are two inflection points 1013 on the object-side surface 1011 of the first lens element 1010. An image-side surface 1012 of the first lens element 1010 is concave. An object-side surface 1021 of the second lens element 1020 is convex. An image-side surface 1032 of the third lens element 1030 is concave.

The detailed data of the wide viewing angle optical lens assembly 100 is as shown in Table 10-1 below.

TABLE 10-1

(Embodiment 10)
f = 1.27 mm, Fno = 2.45, HFOV = 45.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.507100 (ASP) | 2.145 | Plastic | 1.535 | 56.3 | −2.20 |
| 2 | | 0.693700 (ASP) | 0.393 | | | | |
| 3 | Lens 2 | 1.644800 (ASP) | 1.952 | Plastic | 1.634 | 23.8 | 6.90 |
| 4 | | 1.421740 (ASP) | 0.425 | | | | |
| 5 | Ape. Stop | Plano | −0.031 | | | | |
| 6 | Lens 3 | 2.024010 (ASP) | 0.815 | Plastic | 1.544 | 55.9 | 1.13 |
| 7 | | −0.7574 (ASP) | 0.500 | | | | |
| 8 | IR-filter | Plano | 0.700 | Glass | 1.517 | 64.2 | — |
| 9 | | Plano | 0.795 | | | | |
| 10 | Image | Plano | — | | | | |

Note:
Reference wavelength is d-line 587.6 nm

Furthermore, the first lens element 1010, the second lens element 1020, and the third lens element 1030 are aspheric, and the aspheric surfaces may satisfy Formula ASP, but are not limited thereto. As for the parameters of the aspheric surfaces, reference is made to Table 10-2 below.

TABLE 10-2

| | Aspheric Coefficients | | | | | |
|---|---|---|---|---|---|---|
| Surface# | 1 | 2 | 3 | 4 | 6 | 7 |
| k | −5.27360E−01 | −1.15811E+00 | −1.00000E+00 | 7.59335E+00 | −5.48167E+01 | −1.22E+00 |
| $A_4$ | −1.74531E−02 | −8.65889E−02 | −3.75158E−04 | 5.29215E−01 | 1.07346E+00 | 2.52E−03 |
| $A_6$ | 8.96687E−04 | 9.23932E−04 | 9.70823E−03 | 9.00953E−01 | −4.03356E+00 | 1.72E−01 |
| $A_8$ | −2.07961E−05 | 1.15769E−03 | 2.33549E−03 | −2.53915E+00 | 2.51012E+01 | 6.78E−01 |
| $A_{10}$ | — | — | −8.56603E−04 | 3.93047E+01 | −6.57883E+01 | 1.98E+00 |
| $A_{12}$ | — | — | 8.20186E−05 | — | — | — |

The content of Table 10-3 may be deduced from Table 10-1.

TABLE 10-3

(Embodiment 10)

| f (mm) | 1.27 | $R_3/R_6$ | −2.17 |
|---|---|---|---|
| Fno | 2.45 | $(R_5 + R_6)/(R_5 − R_6)$ | 0.46 |
| HFOV(deg.) | 45.2 | $R_2/f$ | 0.55 |
| $R_1/|R_5|$ | 1.73 | $f_2/f_3$ | 6.11 |
| $R_3/R_4$ | 1.16 | SL/TTL | 0.34 |

FIG. 10B is a schematic view of longitudinal spherical aberration curves when the lights having a wavelength of 486.1 nm, 587.6 nm, and 656.3 nm are respectively projected in the wide viewing angle optical lens assembly 100 in FIG. 10A. It can be known from FIG. 10B that, no matter the wavelength of the light received by the wide viewing angle optical lens assembly 100 of this embodiment is 486.1 nm, 587.6 nm, or 656.3 nm, the longitudinal spherical aberration generated by the wide viewing angle optical lens assembly 100 is within the range of −0.03 mm to 0.02 mm.

FIG. 10C is a schematic view of astigmatic field curves when the light having the wavelength of 587.6 nm is projected in the wide viewing angle optical lens assembly 100 in FIG. 10A. It can be known from FIG. 10C that, the astigmatic field curvature of the tangential plane generated when the light having the wavelength of 587.6 nm is projected in the wide viewing angle optical lens assembly 100 is within the range of −0.04 mm to 0.02 mm, and the astigmatic field curvature of the sagittal plane is within the range of −0.02 mm to 0.0 mm.

FIG. 10D is a schematic view of a distortion curve when the light having the wavelength of 587.6 nm is projected in the wide viewing angle optical lens assembly in FIG. 10A. It can be known from FIG. 10D that, the distortion ratio generated when the light having the wavelength of 587.6 nm is projected in the wide viewing angle optical lens assembly 100 is within the range of 0% to 5%. As shown in FIGS. 10B to 10D, the wide viewing angle optical lens assembly 100, designed according to the tenth embodiment, is capable of greater angle of view.

What is claimed is:

1. A wide viewing angle optical lens assembly, comprising, in order from an object side to an image side:
    a first lens element with negative refractive power having a convex object-side surface and a concave image-side surface;
    a second lens element with positive refractive power having a convex object-side surface; and
    a third lens element with positive refractive power having a convex image-side surface;
    wherein the wide viewing angle optical assembly has only three lens elements with refractive power, the first lens element, the second lens element, and the third lens element are non-cemented, near an optical axis, the second lens element has a focal length $f_2$, the third lens element has a focal length $f_3$, the object-side surface of the first lens element has a curvature radius $R_1$, the object-side surface of the third lens element has a curvature radius $R_5$, the image-side surface of the third lens element has a curvature radius $R_6$, and the following relations are satisfied:

$0.8<f_2/f_3<1.2;$ $0<R_1/|R_5|<1.0;$ and $0.4<(R_5+R_6)/(R_5-R_6)<2.0.$

2. The wide viewing angle optical lens assembly according to claim 1, wherein the object-side surface of the second lens element has a curvature radius $R_3$, the image-side surface of the third lens element has a curvature radius $R_6$, and the following relation is satisfied: $-2.5<R_3/R_6<-0.7$.

3. The wide viewing angle optical lens assembly according to claim 2, wherein the image-side surface of the first lens element has a curvature radius $R_2$, the wide viewing angle optical lens assembly has a focal length f, and the following relation is satisfied: $0<R_2/f<0.6$.

4. The wide viewing angle optical lens assembly according to claim 1, wherein the object-side surface of the second lens element has a curvature radius $R_3$, the image-side surface of the third lens element has a curvature radius $R_6$, and the following relation is satisfied: $-1.5<R_3/R_6<-0.7$.

5. The wide viewing angle optical lens assembly according to claim 2, wherein the first lens element is plastic, there is at least one inflection point on the first lens element and at least one of the object-side and the image-side surfaces of the first lens element is aspheric.

6. The wide viewing angle optical lens assembly according to claim 2, further comprises a stop and an image plane, an axial distance from the stop to the image plane is SL, an axial distance from the object-side surface of the first lens element to the image plane is TTL, and the following relation is satisfied: $0.3<SL/TTL<0.68$.

7. The wide viewing angle optical lens assembly according to claim 2, wherein the object-side surface of the second lens element has a curvature radius $R_3$, the image-side surface of the second lens element has a curvature radius $R_4$, and the following relation is satisfied: $-0.5<R_3/R_4<0.5$.

8. The wide viewing angle optical lens assembly according to claim 2, wherein a half of a maximal viewing angle in the wide viewing angle optical lens assembly is HFOV, and the following relation is satisfied: $HFOV>60$.

9. A wide viewing angle optical lens assembly, comprising, in order from an object side to an image side:

a first lens element with negative refractive power having a convex object-side surface and a concave image-side surface;

a second lens element with positive refractive power having a convex object-side surface; and a third lens element with positive refractive power having a convex image-side surface;

wherein the wide viewing angle optical assembly has only three lens elements with refractive power, the first lens element, the second lens element, and the third lens element are non-cemented, the wide viewing angle optical lens assembly further comprises a stop and an image plane, near an optical axis, the wide viewing angle optical lens assembly has a focal length f, the second lens element has a focal length $f_2$, the third lens element has a focal length $f_3$, the image-side surface of the first lens element has a curvature radius $R_2$, an axial distance from the stop to the image plane is SL, an axial distance from the object-side surface of the first lens element to the image plane is TTL, and the following relations are satisfied:

$0.8<f_2/f_3<1.2;$ $0<R_2/f<0.56;$ and $0.3<SL/TTL<0.68.$

10. The wide viewing angle optical lens assembly according to claim 9, wherein the object-side surface of the third lens element has a curvature radius $R_5$, the image-side surface of the third lens element has a curvature radius $R_6$, and the following relation is satisfied: $0.4<(R_5+R_6)/(R_5-R_6)<2.0$.

11. The wide viewing angle optical lens assembly according to claim 10, wherein the object-side surface of the second lens element has a curvature radius $R_3$, the image-side surface of the third lens element has a curvature radius $R_6$, and the following relation is satisfied: $-1.5<R_3/R_6<-0.7$.

12. The wide viewing angle optical lens assembly according to claim 10, wherein the object-side surface of the first lens element has a curvature radius $R_1$, the object-side surface of the third lens element has a curvature radius $R_5$, and the following relation is satisfied: $0<R_1/|R_5|<1.0$.

13. The wide viewing angle optical lens assembly according to claim 10, wherein the object-side surface of the second lens element has a curvature radius $R_3$, the image-side surface of the second lens element has a curvature radius $R_4$, and the following relation is satisfied: $-0.5<R_3/R_4<0.5$.

14. A wide viewing angle optical lens assembly, comprising, in order from an object side to an image side:

a first lens element with negative refractive power having a convex object-side surface and a concave image-side surface, wherein the first lens element is plastic with at least one inflection point and at least one of the object-side and the image-side surfaces being aspheric;

a second lens element with positive refractive power having a convex object-side surface; and a third lens element with positive refractive power having a convex image-side surface;

wherein the wide viewing angle optical assembly has only three lens elements with refractive power, the first lens element, the second lens element, and the third lens element are non-cemented, the wide viewing angle optical lens assembly further comprises a stop and an image plane, near an optical axis, the wide viewing angle optical lens assembly has a focal length f, the second lens element has a focal length $f_2$, the third lens element has a focal length $f_3$, the image-side surface of the first lens element has a curvature radius $R_2$, the object-side surface of the second lens element has a curvature radius $R_3$, the image-side surface of the third lens element has a curvature radius $R_6$, an axial distance from the stop to the image plane is SL, an axial distance from the object-side surface of the first lens element to the image plane is TTL, and the following relations are satisfied:

$0.8<f_2/f_3<1.2;$ $0<R_2/f<0.6;$ $-2.5<R_3/R_6<-0.7;$ and $0.3<SL/TTL<0.68.$

15. The wide viewing angle optical lens assembly according to claim 14, wherein the object-side surface of the second lens element has a curvature radius $R_3$, the image-side surface of the third lens element has a curvature radius $R_6$, and the following relation is satisfied: $-1.5 < R_3/R_6 < -0.7$.

16. The wide viewing angle optical lens assembly according to claim 14, wherein the object-side surface of the second lens element has a curvature radius $R_3$, the image-side surface of the second lens element has a curvature radius $R_4$, and the following relation is satisfied: $-0.5 < R_3/R_4 < 0.5$.

17. The wide viewing angle optical lens assembly according to claim 14, wherein the object-side surface of the first lens element has a curvature radius $R_1$, the object-side surface of the third lens element has a curvature radius $R_5$, and the following relation is satisfied: $0 < R_1/|R_5| < 1.0$.

* * * * *